(12) United States Patent
Sabo et al.

(10) Patent No.: US 12,450,825 B2
(45) Date of Patent: Oct. 21, 2025

(54) SURROUND VIEW SYSTEM

(71) Applicant: SAMSUNG ELECTRONICS CO., LTD., Suwon-si (KR)

(72) Inventors: Doron Sabo, Tel-Aviv (IL); Aviad Cohen, Tel-Aviv (IL); Aya Wolf, Tel-Aviv (IL); Liran Azaria, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 298 days.

(21) Appl. No.: 18/303,911

(22) Filed: Apr. 20, 2023

(65) Prior Publication Data
US 2024/0355041 A1 Oct. 24, 2024

(51) Int. Cl.
*G06T 15/20* (2011.01)
*G06T 5/50* (2006.01)
(Continued)

(52) U.S. Cl.
CPC .............. *G06T 15/205* (2013.01); *G06T 5/50* (2013.01); *G06T 5/70* (2024.01); *G06T 7/50* (2017.01); *G06T 7/80* (2017.01); *G06V 10/56* (2022.01); *G06V 10/761* (2022.01); *G06T 2207/20221* (2013.01); *G06V 2201/07* (2022.01)

(58) Field of Classification Search
CPC G06T 15/205; G06T 5/50; G06T 5/70; G06T 7/50; G06T 7/80; G06T 2207/20221; G06T 2207/10028; G06T 2207/30208; G06T 15/503; G06V 10/56; G06V 10/761;
(Continued)

(56) References Cited

U.S. PATENT DOCUMENTS 9,386,302 B2 7/2016 Zeng et al.
9,866,752 B2 1/2018 Zhang et al.
(Continued)

FOREIGN PATENT DOCUMENTS

EP 2983131 2/2016
EP 3362982 8/2018
WO 2017065883 4/2017

OTHER PUBLICATIONS

Chen, X., Yu, M., & Song, Y. (2022). Optimized seam-driven image stitching method based on scene depth information. Electronics 11(12), 1876.*
(Continued)

*Primary Examiner* — Sarah Lhymn
(74) *Attorney, Agent, or Firm* — Morgan, Lewis & Bockius LLP

(57) ABSTRACT

Aspects of the method, apparatus, non-transitory computer readable medium, and system include estimating extrinsic camera parameters of a plurality of cameras based on detection of corners in a camera calibration arrangement by projecting an image of the detected corners onto an image plane of at least one of the plurality of cameras. The aspects further include incrementally tuning a location estimate for the detected corners based on pixels of the projected image, and adjusting the extrinsic camera parameters of the at least one of the plurality of cameras based on the tuned location estimate. The aspects further include generating a virtual image based on the pixels of the projected image mapped to a virtual image plane.

11 Claims, 15 Drawing Sheets

(51) Int. Cl.
*G06T 5/70* (2024.01)
*G06T 7/50* (2017.01)
*G06T 7/80* (2017.01)
*G06V 10/56* (2022.01)
*G06V 10/74* (2022.01)

(58) Field of Classification Search
CPC .. G06V 2201/07; G06V 10/74; H04N 13/122; H04N 13/246; H04N 13/282; B60R 1/27
See application file for complete search history.

(56) References Cited

U.S. PATENT DOCUMENTS

| | | | |
|---|---|---|---|
| 9,892,493 | B2 | 2/2018 | Pekkucuksen et al. |
| 9,978,146 | B2 | 5/2018 | Hedi et al. |
| 10,085,011 | B2 | 9/2018 | Lin et al. |
| 10,102,610 | B2 | 10/2018 | Forutanpour et al. |
| 10,136,055 | B2 | 11/2018 | Lei et al. |
| 10,235,775 | B2 | 3/2019 | Singh et al. |
| 10,425,638 | B2 | 9/2019 | Yu et al. |
| 10,621,767 | B2 | 4/2020 | Forutanpour et al. |
| 11,303,806 | B2 | 4/2022 | Appia et al. |
| 11,350,073 | B2 | 5/2022 | Fan et al. |
| 11,380,016 | B2 | 7/2022 | Su |
| 2012/0287232 | A1 | 11/2012 | Natroshvili et al. |
| 2016/0042515 | A1 | 2/2016 | Sorgi et al. |
| 2017/0127045 | A1 | 5/2017 | Lin et al. |
| 2018/0007263 | A1* | 1/2018 | Vandrotti ............. H04N 23/698 |
| 2019/0058870 | A1 | 2/2019 | Rowell et al. |
| 2020/0314435 | A1* | 10/2020 | Tourapis .................. G06T 7/74 |
| 2021/0142497 | A1* | 5/2021 | Pugh ....................... G06T 7/543 |
| 2022/0030212 | A1 | 1/2022 | Aggarwal et al. |
| 2022/0118907 | A1 | 4/2022 | Onishi et al. |
| 2023/0316635 | A1* | 10/2023 | Jiang ......................... G06T 7/70 345/418 |

OTHER PUBLICATIONS

Fu M, Liang H, Zhu C, Dong Z, Sun R, Yue Y, Yang Y. Image stitching techniques applied to plane or 3-D models: a review. IEEE Sensors Journal. Mar. 8, 2023;23(8):8060-79.*

Lin, K., Jiang, N., Cheong, L. F., Do, M., & Lu, J. (2016). Seagull: Seam-guided local alignment for parallax-tolerant image stitching. In Computer Vision—ECCV 2016: 14th European Conference, Amsterdam, The Netherlands, Oct. 11-14, 2016, Proceedings, Part III 14 (pp. 370-385). Springer International Publishing.*

Dosovitskiy, et al., "CARLA: An Open Urban Driving Simulator", in Proceedings of the 1st Annual Conference on Robot Learning, arXiv preprint arXiv:1711.03938v1 [cs.LG] Nov. 10, 2017, pp. 1-16.

Harris, et al., "A Combined Corner and Edge Detector", In Alvey Vision Conference, 1988, pp. 147-152.

Zhao, et al., "Monocular Depth Estimation Based on Deep Learning: An Overview", In Science China Technological Sciences, vol. 63, Jun. 10, 2020, pp. 1-16.

Lin, et al., "Adaptive as-Natural-as-Possible Image Stitching", In Proceedings of the IEEE Conference on Computer Vision and Pattern Recognition, 2015, pp. 1155-1163.

Zhang, et al., "Parallax-Tolerant Image Stitching", In Proceedings of the IEEE Conference on Computer Vision and Pattern Recognition, Jun. 23, 2014, pp. 3262-3269.

Baek, et al., "Thin-Plate Spline-based Adaptive 3D Surround View", In IEEE Intelligent Vehicles Symposium (IV), Jun. 2019, pp. 586-593.

Zaragoza, et al., "As-Projective-as-Possible Image Stitching with Moving DLT", In Proceedings of the IEEE Conference on Computer Vision and Pattern Recognition, Jun. 2013, pp. 2339-2346.

Garcia, "3D Reconstruction for Optimal Representation of Surroundings in Automotive HMIs, Based on Fisheye Multi-Camera Systems", In ResearchGate, Jan. 2015, 183 pages.

Lee, et al., "Warping Residual Based Image Stitching for Large Parallax", In Proceedings of IEEE/CVF Conference on Computer Vision and Pattern Recognition, Jun. 2020, pp. 8198-8206.

Saputra, et al., "Visual SLAM and Structure from Motion in Dynamic Environments: A Survey", In ACM Computing Surveys (CSUR), vol. 51, No. 2, Article 37, Feb. 2018, 36 pages.

Xiong, et al., "Color Matching of Image Sequences with Combined Gamma and Linear Corrections", In ACM, Oct. 25-29, 2010, 10 pages.

Wang, et al., "Image Quality Assessment: From Error Visibility to Structural Similarity", In IEEE Transactions on Image Processing, vol. 13, No. 4, Apr. 2004, pp. 600-612.

* cited by examiner

SURROUND VIEW SYSTEM

BACKGROUND

The following relates to surround view (SV), and more specifically to a multiple camera Surround View System (SVS).

In-Vehicle Infotainment (IVI) systems can include in-cabin systems that can provide audio and video information, plus entertainment to a vehicle's driver and passengers. New automobiles can feature multimedia, video streaming, and 3D maps that can be interacted with through touchscreen displays, voice commands or push-button panels. These automobiles can also come with a host of safety features (referred to as Advanced Driver Assistance Systems (ADAS)). These IVI systems can work seamlessly with the safety systems and provide an enhanced user experience. Multiple screens and displays can be utilized to provide the information and control interfaces to a driver and form a digital cockpit.

Cameras are the sensors used to capture images. The cameras take the points in the 3-dimensional (3D) world and project them onto a 2-dimensional (2D) plane as images. A Surround View System can provide a 360 degree virtual view around the entire vehicle using the cameras of the ADAS.

SUMMARY

Embodiments of the present disclosure provide a calibration and implementation of a surround view system (SVS) that use images from multiple cameras to form a virtual bird's eye view image.

Approaches for generating a view that looks as if it was captured from virtual camera can receive and stitch together images from multiple cameras, and blend the received images to reduce artifacts and visual seams. Surround View Camera Systems can project a bird's eye view of the vehicle's surroundings on the display screen, where the images from the cameras are stitched together on a flat surface.

A method, apparatus, non-transitory computer readable medium, and system for calibrating a camera system are described. One or more aspects of the method, apparatus, non-transitory computer readable medium, and system include estimating extrinsic camera parameters of a plurality of cameras based on detection of corners in a camera calibration arrangement by projecting an image of the detected corners onto an image plane of at least one of the plurality of cameras. The aspects further include incrementally tuning a location estimate for the detected corners based on pixels of the projected image, and adjusting the extrinsic camera parameters of the at least one of the plurality of cameras based on the tuned location estimate. The aspects further include generating a virtual image based on the pixels of the projected image mapped to a virtual image plane.

A method, apparatus, non-transitory computer readable medium, and system for generating a virtual camera view are described. One or more aspects of the method, apparatus, non-transitory computer readable medium, and system include receiving a plurality of adjoining images, wherein the plurality of adjoining images include pixels. The aspects further include detecting one or more objects in each of the plurality of adjoining images, and receiving depth information for the pixels of the one or more detected objects. The aspects further include analyzing a mismatch between each of the adjoining images, and prioritizing the image having a closer detected object based on the depth information. The aspects further include forming a virtual image by merging the adjoining images together, wherein pixels of the prioritized image are used in an overlap region of the adjoining images, and identifying a seam location between the adjoining images according to a path of minimal depth discrepancy between the adjoining views.

An apparatus and system for a virtual image generation system are described. One or more aspects of the apparatus and system include a plurality of cameras positioned relative to an origin, a memory component, and one or more processing devices coupled to the memory component, the processing devices to perform operations of generating a virtual image from a plurality of adjoining images received from the plurality of cameras, wherein the virtual image generation system is configured to generate a virtual image from a plurality of adjoining images received from the plurality of cameras, wherein each of the adjoining images include pixels, and wherein the virtual image is formed based on a mismatch between each of the adjoining images and prioritizing the adjoining image that has a closer object based on depth information, and merging the adjoining images together, wherein pixels of the prioritized image are used in an overlap region of the adjoining images.

DETAILED DESCRIPTION

Principles and embodiments of the present invention generally relate to calibrating a plurality of cameras of a surround view camera system that compose a surround view image from the physical cameras images.

In three-dimensional (3D) surround view systems, the surroundings of a vehicle are shown in a 3D representation, which can have a spherical form, where the surroundings can be projected onto the 3D model. A vehicle can be a model of the vehicle, that can be rendered onto the surround view image. Because the model is a 3D representation of the surroundings in 360-degrees, the view can be determined from various angles around the vehicle.

To render a virtual image, the 3D structure of a scene should be known, such that each pixel (each 2D coordinate) detected by each of the multiple physical cameras can be mapped to a corresponding 3D coordinate in the real world, and then mapped back from the 3D world coordinates to virtual image 2D coordinates viewed by a virtual camera. Such manipulations involve knowledge of not only the physical and virtual camera parameters, both extrinsic and intrinsic, but also the depth of each pixel in the real world. Camera models (e.g., Pinhole Camera Model) are a mapping from world coordinates to image coordinates, which is a 3D to 2D transform. The mapping can be done knowing the depth; however, if the depth is not available, the camera model can describe the mapping from 3D direction/angle or from 3D position on a unit sphere to a 2D model.

Camera calibration can be considered as one of the challenging tasks while deploying a surround view system in a vehicle. Camera calibration is the process of calibrating the surround view cameras with the outside environment. Camera calibration ensures proper functioning of the surround view system, as improper camera calibration may cause non-aligned image stitching, ghosting and faulty color correction. Due to occlusions, there can be objects that would be "visible" to a virtual camera because of its virtual positioning, but are not visible to any of the actual, physical cameras. Therefore, there is no way to retrieve this information directly from the images of the physical cameras.

The embodiments of the present invention can provide a new and previously unobtainable view of the vehicle (e.g., car, truck, van, etc.) in its surrounding using input from multiple cameras. Multiple input images are used to generate a bird's-eye-view of the 360 degree vehicle surroundings in real time, where the multiple images are projected from the real cameras to a virtual camera. The system can correct distortions created by wide-angle cameras (e.g., fish-eye lenses) used to capture the input images, and generate a seamlessly stitched 360 degree composite view with the perspective of a single camera from above the vehicle.

Figure 1:
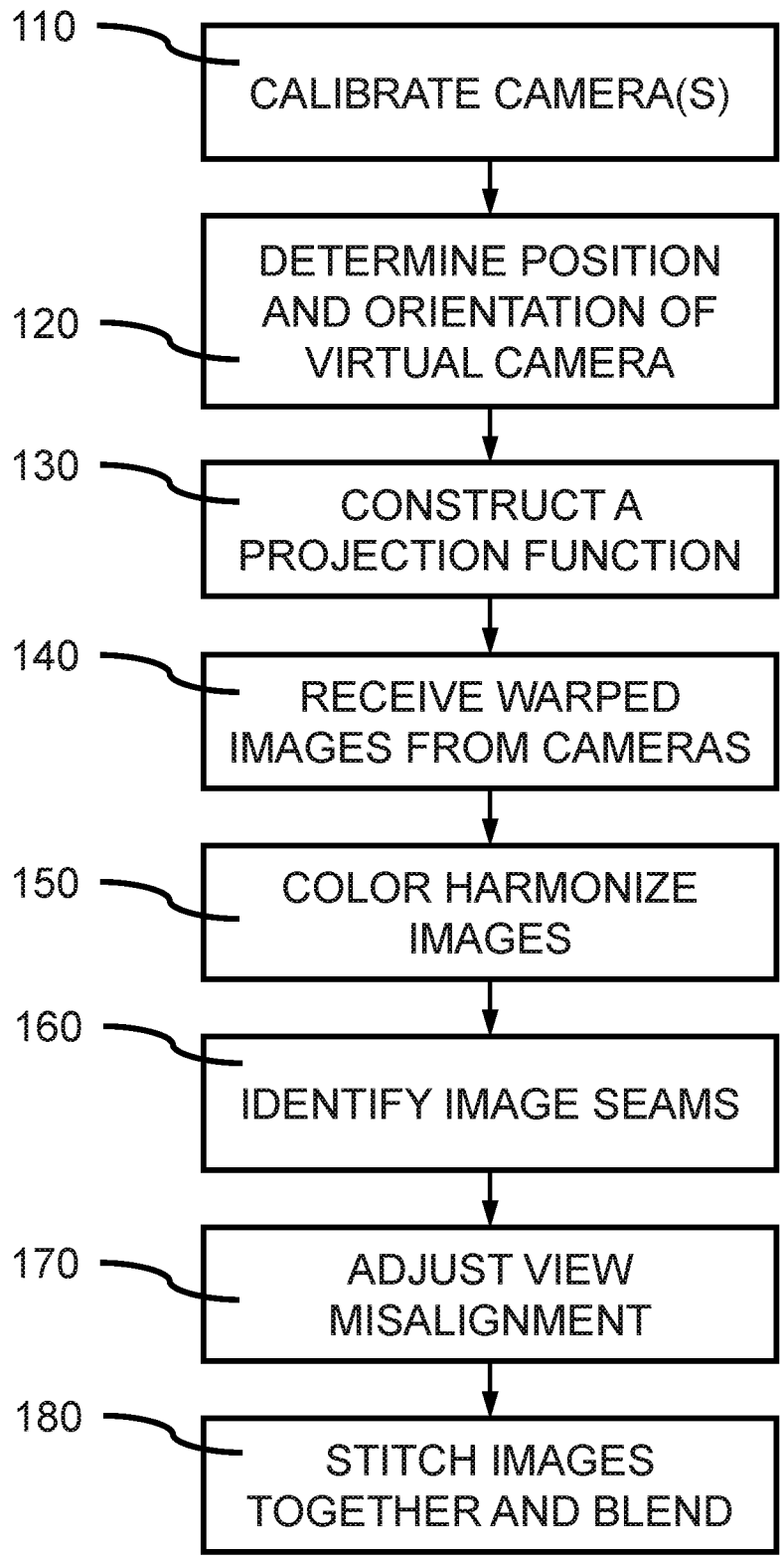
FIG. 1 is an illustrative depiction of a high-level block/flow diagram showing a method of calibration of a surround view system and composing a surround view image out of the physical camera images, according to aspects of the present disclosure.

FIG. 1 is an illustrative depiction of a high-level block/flow diagram showing a method of calibration of a surround view system and composing a surround view image out of the physical cameras images, according to aspects of the present disclosure.

At operation 110, the cameras to be used for image capture are calibrated to identify the different model parameters, for example, the intrinsic, extrinsic, and distortion parameters for the cameras and camera system. Camera calibration is the process of computing the extrinsic and intrinsic parameters of a camera. Camera calibration can provide for proper functioning of the surround view system because improper camera calibration can cause non-aligned image stitching, ghosting and faulty color correction. Once a camera has been calibrated, the image information can be utilized to recover 3-D information from 2-D images. Calibration can also allow compensation for the distortion of images taken with a fisheye camera lens.

Intrinsic parameters can include the optical center of the camera(s), the camera(s) focal length(s), camera projection(s), sensor resolution(s), and lens distortion(s), where these parameters can affect image distortion. The intrinsic parameters in camera calibration can be dependent on the camera suppliers (e.g., automotive camera suppliers). Extrinsic camera parameters represent the location of the camera in the 3-D scene. Extrinsic parameters are camera parameters that can change with respect to the world reference frame. The extrinsic camera parameters include a rotation, R, and a translation, t. The world points are transformed to camera coordinates using the extrinsic parameters.

Intrinsic parameters represent the optical center and focal length of the camera. Intrinsic parameters are fixed to the camera components and a particular camera/digitization setup. The intrinsic parameters include the focal length, the optical center, also known as a principal point, and a skew coefficient. The camera coordinates can be mapped into the image plane using the intrinsic parameters. For a fisheye camera model, the intrinsic parameters include the polynomial mapping coefficients of the projection function.

Extrinsic parameters include the relative positions and orientation of the cameras with respect to a common point, which can be in the vehicle's body. Extrinsic parameters in camera calibration can determine image overlap regions, which can affect improper overlapping of a surround view image. Camera calibration may also be affected by the vehicle suspension, where a faulty suspension can affect the displacement of the camera position(s). The z-axis of the camera coordinate system can be the axis facing outward/inward from the camera lens (i.e., the camera principal axis). The optical axis intersects the image plane at a point, p, referred to as a principal point. The optical center or camera center, C, can be at an origin (0, 0, 0). The image plane is the plane on which the image is formed.

These intrinsic and extrinsic parameters can be represented as transformation matrices that convert points from one coordinate system to the other. The transformation matrix that converts points from the world coordinate system to the camera coordinate system is referred to as the camera extrinsic matrix, whereas the intrinsic matrix is a transformation matrix that converts points from the camera coordinate system to a pixel coordinate system. The camera extrinsic matrix changes if the physical location and/or orientation of the camera is changed, for example, a camera on a moving car. A 4×4 homogeneous camera matrix can transform coordinates from the world space to the camera space.

Lens distortion can include radial distortion, decentering distortion, and thin prism distortion. Radial distortion occurs when light rays bend more near the edges of a lens than the light rays bend at the lens's optical center, for example, barrel distortion and pincushion distortion. The smaller the lens, the greater the distortion can be. Parameters for a radial distortion function or distortion model can be obtained for correcting the distorted images, however image distortion is an inherently nonlinear effect.

At operation 120, the position and orientation of the camera(s) can be determined based on a selected coordinate system (e.g., x, y, z) for the three-dimensional space to be imaged, where the extrinsic parameters can be based on the position and orientation values. The coordinate system can describe an absolute position of the focal plane in a world coordinate system.

In one or more embodiments, the cameras' three-dimensional coordinates can be based on an origin and axis of the vehicle's 3D coordinate system, where the x-axis can indicate lateral camera positioning and the y-axis can indicate vertical camera positioning relative to the specified origin. The camera calibration can be based on the vehicle's 3D reference coordinate system, so that there are no changes in the extrinsic camera parameters when a vehicle moves straight ahead on a flat, well-paved road.

At operation 130, a projection function can be constructed, where the projection function, p, (also referred to as a perspective projection function) relates the world coordinates X to canonical image coordinates x.

At operation 140, a camera system can receive a plurality of warped images from a plurality of cameras, where each camera can provide one or more warped images. The camera system can include a plurality of cameras attached to a vehicle, such that the cameras provide overlapping fields of view. Each image of each camera is warped according to the camera's projection function. The camera system can receive n warped images, where "n" is the number of physical cameras. The warped images may subsequently be stitched together.

At operation 150, the images can be color harmonized, where statistics can be collected for the pixels of an overlapping region of adjoining images provided by each pair of adjacent cameras. In various embodiments, the statistics can include, for example, average brightness, color values (e.g., red-blue-green (RBG)), etc. An indicator that two images were not obtained by the same camera is that the colors do not match across the images.

In various embodiments, different cameras may be exposed to different lighting conditions with different illumination types and intensities. These different lighting conditions in turn can yield photometric differences that can be visible along a seam between each pair of camera images. Photometric alignment adjusts the brightness and color mismatch between images, where the brightness and color of the different images can be synchronized before the camera images are combined together. A special correction may also be performed along the borders of the combined (also referred to as "stitched") images. In various embodiments, a color and/or brightness mapping function can be computed for each camera to align the brightness and color appearance of the images.

At operation 160, the seams between adjoining images can be identified, where an overlapping image region can have a boarder along two sides of the region. A seam that separates the two adjoining images can be selected based on minimal depth differences and/or minimal photometric differences between the two images, thereby obtaining a minimal mismatch between the adjoining images. The depth difference can be based on depth information for a detected object, where an object may be detected in one or both of the adjoining images utilizing an object detection method. The seam location can be identified between the two adjoining images according to a path of minimal depth discrepancy and/or minimal photometric difference between the adjoining views. In various embodiments, there can be n images ordered one after the other, where an image, i, overlaps with images i−1 And i+1, where there can be an overlap between the first and last images to form a continuous surround view. A merged image can be formed by merging the adjoining images along the seam.

At operation 170, a view misalignment may be adjusted to find and fix local warpings. In various embodiments, mismatches between each of the adjoining images can be analyzed using depth information or using optical flow to find correspondences between different views. Local warpage can be computed and adjusted.

At operation 180, the selected portions of adjoining images can be stitched together and blended to form a single image, where the pixels of the overlapping region can be blended, so that the seam between them would not be visible. A virtual image can be formed by merging the adjoining images together, where the pixels of a prioritized image can be used in the overlapped region of the adjoining images.

Figure 2:
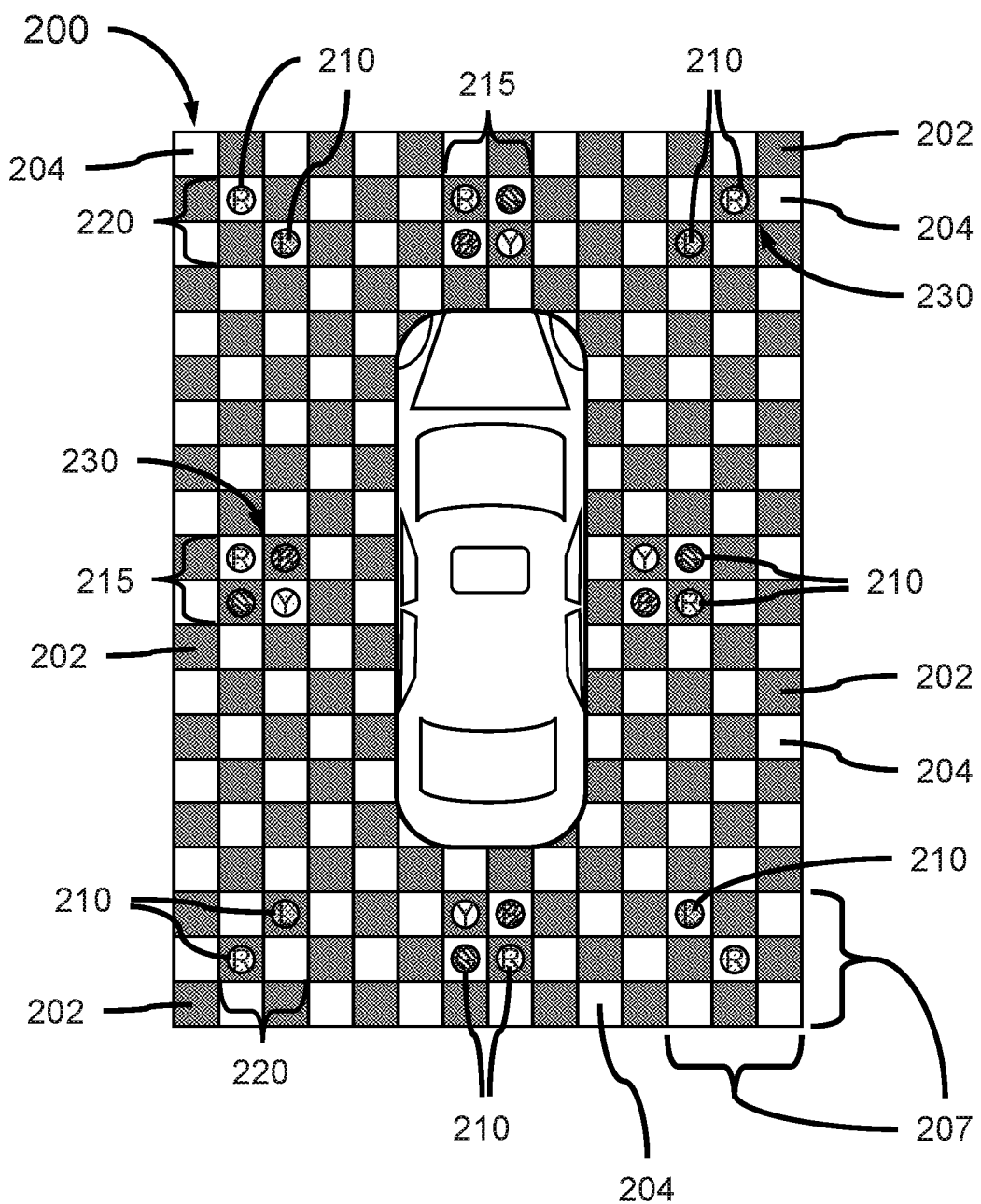
FIG. 2 shows a top view of a calibration chart for a surround view camera calibration arrangement, according to aspects of the present disclosure.

FIG. 2 shows a top view of a calibration chart for a surround view camera calibration arrangement, according to aspects of the present disclosure.

In various embodiments, a chessboard chart 200 with colored dots 210 (circles) in known locations having predetermined colors can be used as a calibration chart, where the chessboard may be in black and white or contrasting colors. (For clarity and simplicity, the chessboard squares will be referred to as black and white, as shown in the figure.) The colored dots on the chessboard can be used as anchors for the calibration, where the colored dots are in the field of view of one camera and can be in the field of view for at least two of the cameras. In various embodiments, four colored dots 210 ("R"=red, "G"=green, "B"=blue, "Y"=yellow) are placed in front of each camera to provide for anchor detection, where the four colored dots 210 can be arranged in a square pattern 215. In various embodiments, a pair of colored dots 210 including a gray colored ("L"=gray) circle and a red colored circle can be placed in a diagonal pattern 220 at the corners 207 of the chessboard chart 200. The chessboard chart 200 can have two black corner squares 202 and two white corner squares 204 to determine the orientation of the pattern and the origin. The colored dots 210 can be used as anchors with known locations on the chart, where the corners 230 around the dots can be used for an initial calibration, for example, around the four colored dots 210 there are nine (9) corners 230 that can be used for an initial calibration.

In various embodiments, the chessboard chart 200 can be used as the calibration pattern for the camera calibration. The control points for this pattern are the intersecting corners 230 that lie inside the outer boundary of the chessboard. The intersecting corners 230 formed by the change in color between black squares 202 and white squares 204 of the chessboard chart 200 are sufficiently small, that the corners can be effectively invariant to perspective and lens distortion. The intersecting corners 230 can be detected using a corner detection method, for example, a Harris corner detector that identifies a corner as the junction of two edges, where an edge is a sudden change in image brightness. At a corner, the brightness changes in at least two perpendicular directions. In contrast, for an edge region, no brightness gradient or sudden change is observed along the direction parallel to the edge. A corner detection score can be based on a Harris corner detection method.

In various embodiments, the surround view system can detect the four colored dots 210, and the 3×3 arrangement of black squares 202 and white squares 204 including the two colored dots 210 at the corners 207 of the chessboard chart 200, where both the four dots in a square pattern 215 at center positions, and the two dots 210 in a diagonal pattern 220 at corner positions can be identified and used for calibration anchors. The two colored dots 210 at the corners 207 in the diagonal pattern 220 may be seen from two different cameras, so may be used as references to calibrate overlapping cameras. For calibration, the corners 230 for which the 3D positions on a common coordinate system are known can be detected by the model. The anchors (two and four colored dots) can be used as reference points for locating the corners 230 of the chessboard chart 200 within the coordinate system. By detecting the colored dots 210, the neighboring corners can be identified. For initial calibration, the immediate neighboring corners of the four colored dots can be used, whereas additional corners can be utilized to further enhance the calibration accuracy.

In various embodiments, to find initial values of the extrinsic parameters (rotation and translation for each camera) the pattern 215 of four colored dots 210 and the intersecting corners 230 of the black and white squares including the four colored dots can be detected.

In various embodiments, a sub-pixel refinement process can be utilized to find the accurate corner locations 230, where a location estimate for the detected corners can be incrementally tuned to provide a tuned location estimate. A camera calibration arrangement providing a camera calibration pattern having a plurality of corners and colored dots can be used for detection by one or more cameras positioned relative to the camera calibration pattern, and tuning of the corner detection.

Figure 3:
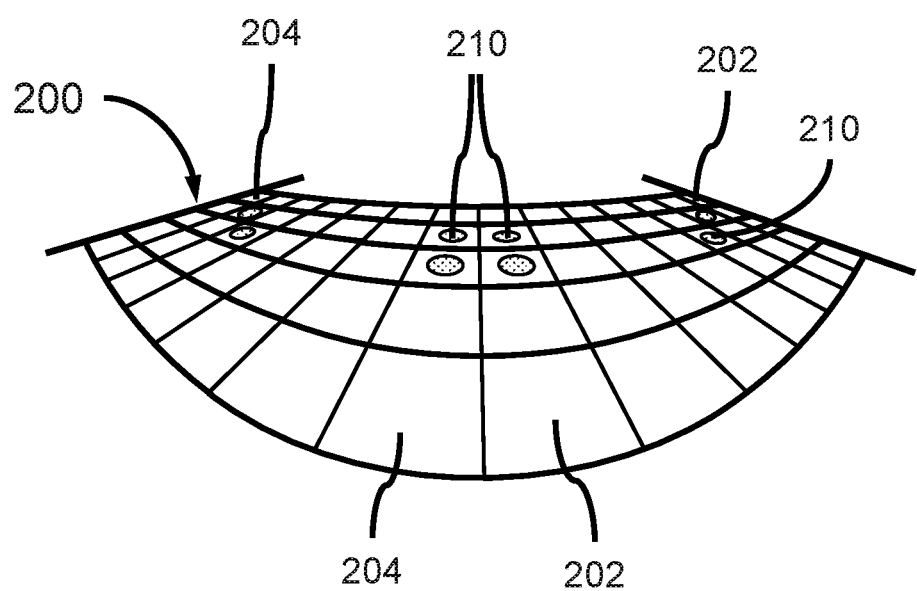
FIG. 3 shows an example of a calibration chart as seen by a camera, according to aspects of the present disclosure.

FIG. 3 shows an example of a calibration chart as seen by a camera, according to aspects of the present disclosure.

In various embodiments, the calibration chart, as seen by a camera, includes the distortions introduced by the camera lens (e.g., fisheye lens), and may include barrel distortion and pincushion distortion. The calibration can determine the parameters to account for the image distortions.

Figure 4:
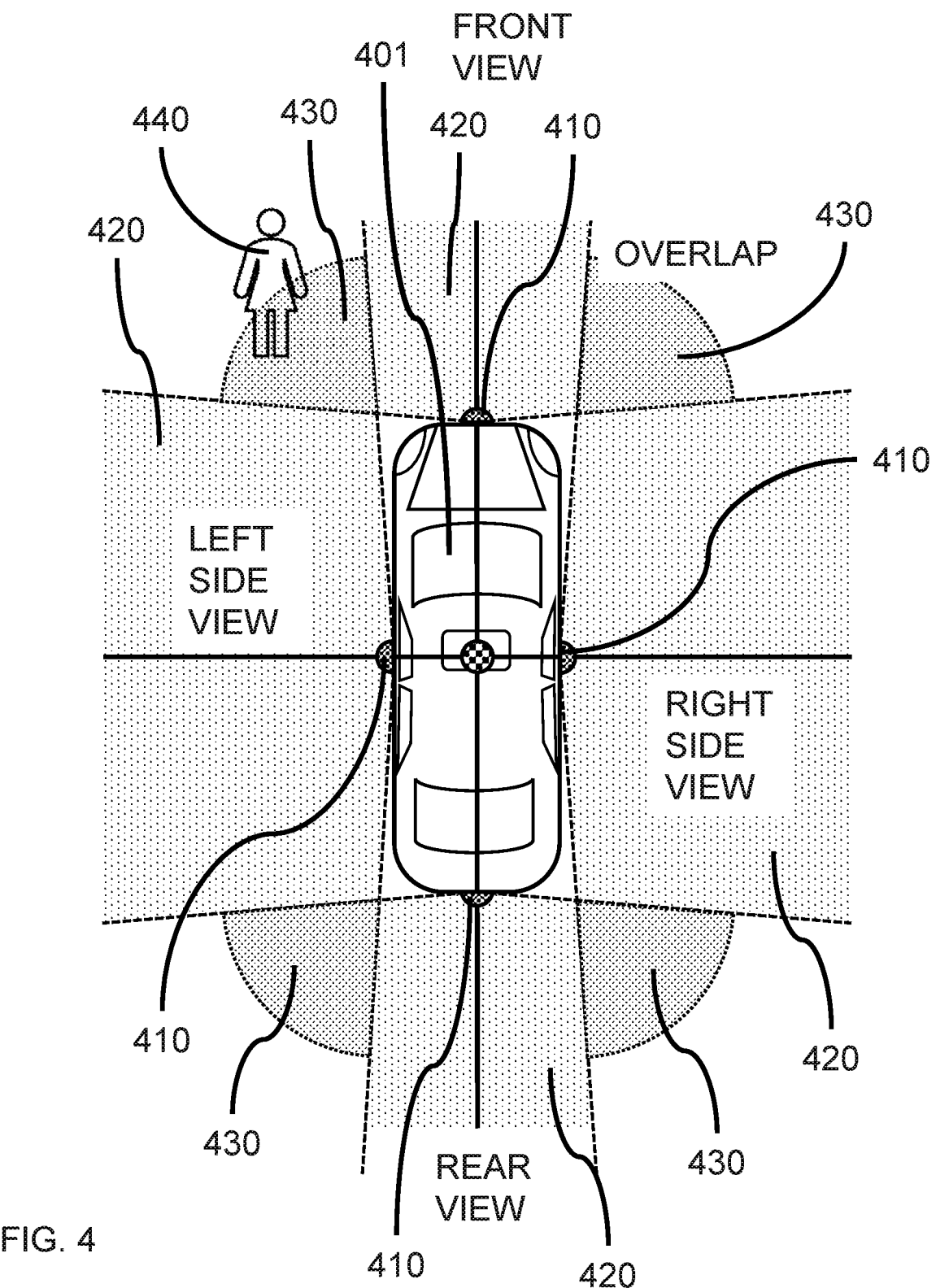
FIG. 4 shows a top view of overlapping fields of view for a surround view system, according to aspects of the present disclosure.

FIG. 4 shows a top view of overlapping fields of view for a surround view system, according to aspects of the present disclosure.

In one or more embodiments, a surround-view system can use four visual sensors (e.g., digital cameras) to form a combined view with overlap regions, sufficient to cover a near-field area. A fisheye camera lens offers a significantly wider field-of-view than standard camera lens, and can be used to achieve complete visual coverage around a vehicle 401. For example, four cameras 410 with fisheye lenses on each of the four sides of the vehicle 401 can be sufficient to cover 3600 around the vehicle and capture an entire near-field region. However, due to the large radial distortion of fisheye lenses, standard algorithms may not be utilized for surround view models.

In a non-limiting exemplary embodiment, a front-view camera is mounted on the front bumper, a rearview camera is mounted on the trunk lid or rear bumper, and a side-view camera is mounted in each sideview mirror to provide a 360 degree view around the vehicle. The camera placement specifications can be obtained from the actual positions of the cameras on the vehicle, including vertical and horizontal displacement from a physical origin (0, 0, 0) in the world reference frame. The camera placement position and orientation (extrinsic parameters) can be obtained from the calibration process. The position (3 displacements in 3 axes) and orientation (3 angles) are described in a common coordinate system. The origin (and orientation) of the coordinate system may be some arbitrary point within the vehicle, where the coordinate system reference can move with the vehicle.

In various embodiments, each camera 410 has an individual field of view 420 that only the particular camera observes, and can form an overlapping field of view 430 with an adjacent camera 410. The individual fields of view 420 can be a left-side view, a right-side view, a front view and a rear view, although other positioning of the cameras providing different views, and different numbers of cameras with different positions and views are also contemplated. The adjacent cameras can generate adjoining images having an overlapping region. A seam can be formed in the overlapping region between adjoining fields of view.

In various embodiments, an object 440 (e.g., a person, another vehicle, a mailbox, a light post, etc.) can be present in an overlapping field of view 430, where both adjacent cameras capture at least a partial image of the object 440. The combined image formed by two adjacent cameras 410 can suffer from the disappearance or duplication of the object 440 in the combined image, when the object is in the overlapping field of view 430 of the cameras 410. The image of the object 440 can also suffer from ghosting. An object may be in an individual field of view 420.

In various embodiments, the use of a bounding box for object detection in images becomes more complex, as the bounding box does not provide an optimal fit for a fisheye distorted object. Object detection can be performed based on depth information and/or optical flow detection/calculations.

Figure 5A:
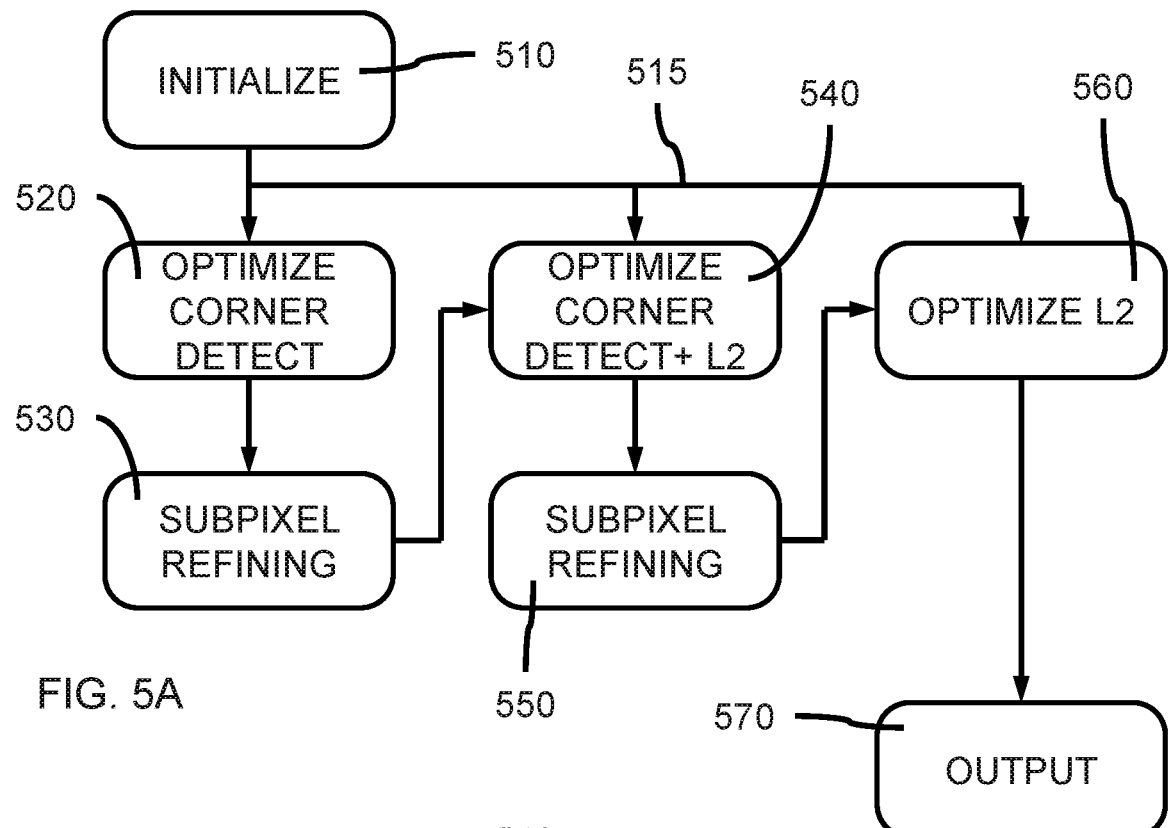
FIG. 5A shows an optimization process with concurrently initialized processes, according to aspects of the present disclosure.

FIG. 5A shows an optimization process with concurrently initialized processes, according to aspects of the present disclosure.

In various embodiments, the results of the initialization stage 510 can provide estimated extrinsic and optical distortion parameters, which can be used to independently initialize 515 the optimization processes 520, 540, 560 concurrently.

In various embodiments, by using the nine (9) points (e.g., the 9 corners of the adjoining squares containing the 4 colored dots) the initial extrinsic parameters of rotation and translation for each camera can be estimated. The optimization processes 520, 540, 560 may minimize different loses by optimizing both extrinsic and optical distortion parameters using the initial extrinsic parameters, while projecting known 3D coordinates (e.g., the corners on the chessboard 200) onto the cameras' image planes using the parameters. Both extrinsic parameters and optical distortion parameters of all the cameras can be optimized simultaneously, where different loss terms can be used by the different optimization processes in order to optimize the parameters. For example, by detecting the four colored anchor dots, the 9 corners of the 2×2 black/white squares that include these dots can be located and identified, where the 9 corners can be used for the initialization and/or optimization.

In various embodiments, a first optimization process 520 can use a corner score as a loss term, for example, a Harris corner detector score, where a Harris corner detector method uses a local maxima with rotationally invariant scalar measures, for example, a [−2, −1, 0, 1, 2] filter to detect a corner in the image. The calculated value for a corner score can indicate the degree of the corner (i.e., a "corner-ness" rating)

detected in the image. In various embodiment, the corner-ness score may be used in the loss term, where the calibration parameters can be estimated, so that the corner-ness score (e.g., corner detection score) of the projected corner positions on the image plane would be maximized, rather than directly using a maxima from the Harris corner detector method.

In various embodiments, first optimization process 520 may maximize the total "corner-ness" score (also referred to as a location estimate for detected corners) in the projected pixels. For example, as shown in the following equation:

$$\text{Loss}_1 = -\sum\nolimits_{i \in corners} S(P(X_i; \theta_i));$$

where $X_i$ are the corners' 3D points, P is the projection function from 3D coordinates to the camera coordinates, where the projection is dependent on the extrinsic and optical distortion parameters $\theta_i$, and S is the corner score function.

In various embodiments, to find the actual location of the intersecting corners 230 a first sub-pixel refinement process 530 can be used.

In various embodiments, a second optimization process 540 can use different loss terms to detect periphery corners and central corners, where the accuracy of the corners' location estimation in the cameras' images is reduced at the image periphery due to reduced camera spatial resolution away from the center. Central corner are corners that are closer to the optical center of a camera compared to periphery corners. The division to central/periphery can be predefined by the user, and can be tuned manually, according to resolution, image distortion, etc.

In various embodiments, a distance from the coordinates already estimated in the first optimization process 520 can be used for the central corners, e.g., using an $L_2$ norm. In various embodiments, a corner loss the same as that used for the first optimization process 520 can be used for optimizing the periphery corners located further away from the camera's optical center.

The following is an example equation of such a loss that uses an $L_2$ norm for the central corners.

$$\text{Loss}_2 = \sum\nolimits_{\substack{i \in center \\ corners}} |P(X_i; \theta_i) - x_{i,1}|_2 - \sum\nolimits_{\substack{i \in periphery \\ corners}} S(P(x_i; \theta_i));$$

where $|\cdot|_2$ is the $L_2$ norm, and $x_{i,1}$ are the corner locations, as estimated in the first optimization stage. A second sub-pixel refinement process 550 can be applied, so more accurate location of all corners in the image can be determined.

In various embodiments, a third optimization process 560 can use the distance from the coordinates estimated in the second optimization process 540 subsequent to the second sub-pixel refinement process 550, as the loss for all corners, for example, by using the $L_2$ norm without the corner loss:

$$\text{Loss}_3 = \sum\nolimits_{\substack{i \in center \\ corners}} |P(X_i; \theta_i) - x_{i,2}|_2;$$

where $x_{i,2}$, are the corners locations as estimated in the second optimization process 540.

In various embodiments, alignment optimization for surround view that improves the alignment between the projection of each camera to the virtual camera image plane on the overlapped regions can be applied. In various embodiments, a specific world model and specific virtual camera parameters (extrinsic and intrinsic) can be utilized. For example, a flat world model and some bird's eye view (BEV) position of the virtual camera can be used. The alignment optimization may be performed subsequent to the previous optimizations, for example, as a final optimization, or alignment optimization may be performed after each of the previous individual optimization processes 520, 540, 560.

In various embodiments, the mapping from some point k with coordinates $x_i^k$ on camera i's image plane to the projected 3D point on the world model can be denoted as:

$$X = P_i^{-1}(x_i^k; \theta_i; \pi);$$

where $\pi$ represents the world model parameters.

In various embodiments, the pixels of the image projected on the camera's image plane can be mapped to a virtual image plane to generate a virtual image, where each camera can contribute to the generated virtual image. The image(s) from the real camera(s) can be projected onto the virtual camera, where the pixels of the camera images can be projected to coordinates of a virtual camera using a mapping between the real and virtual camera(s).

In various embodiments, the mapping from the same 3D point to the virtual camera image plane can be denoted as:

$$x_{virt} = P(X_{virt}; \theta_{virt}; \pi).$$

By assuming that the matched point to point k on camera i's image plane is point 1 on the camera j's image plane, a distance metric (e.g. $L_2$ norm) can be described as:

$$d_{kl}(x_{virt}^i, x_{virt}^j) = d(P_i^v(x_i^k), P_j^v(x_j^l));$$

where $P_i^v(x) = P(P_i^{-1}(x_i^k; \theta_i; \pi); \theta_{virt}; \pi)$ is the mapping from camera i image plane to the virtual camera image plane.

In various embodiments, the loss term can be defined, for example, as the sum of the distances of all matched points (e.g. matched detected corners) in all overlapped views:

$$\text{Loss}_{align} = \sum\nolimits_{\substack{i,j \in couples\ of \\ adjacent\ cameras}} \sum\nolimits_{\substack{k,l \in matched\ points \\ in\ cameras\ i,j}} d_{kl}.$$

In various embodiments, photometric differences between projected images of adjacent cameras over the overlapped regions can be applied as a loss term. As with alignment loss, a mapping from camera i to the virtual camera $P_i^v$ can be recognized. A contribution of a pixel to a virtual image can be determined based on a calculated photometric difference. Pixel $x_i^k$ is projected to coordinates $P_i^v(x_i^k)$ for the virtual camera. The inverse projection from the virtual camera to camera i can be $P_i^v$. The contribution of camera i to the virtual image in coordinate $x_v^k$ is $p_i^k = \text{Im}_i(P_v^i(x_v^k))$, where Im$_i$(x), is the pixel's value for Image i at coordinates x, where x may be a non-integer number, and hence the pixel's value may be a result of some interpolation. A seam location can be identified between the two adjoining images according to a path of minimal depth discrepancy and/or minimal photometric difference between the adjoining views.

The contribution of camera j to the virtual image in coordinate $x_v^k$ can be:

$$p_j^k = \text{Im}_j(P_v^j(x_v^k)).$$

Then, if coordinate $p_i^k$ is visible in camera i (that is, the coordinates are within the image boundaries) and $p_j^k$ is visible in camera j, the photometric distance between $p_i^k$ and $p_j^k$ can be minimized.

$$\text{Loss}_{photo} = \sum_{\substack{i,j \in \text{couples of} \\ \text{adjacent cameras}}} \sum_{\substack{k \in \text{ pixels in virtual camera} \\ \text{with visible projection}}} pd(p_i^k, p_j^k);$$

where, pd(·) is the photometric distance. The photometric distance of $p_i^k$, $p_j^k$ may use the values of $p_i^k$ and $p_j^k$ or a patch of pixels (neighborhood of $p_i^k$, $p_j^k$). It can use metrics, for example, $L_2$ norm, SAD, SSIM, etc.

Figure 5B:
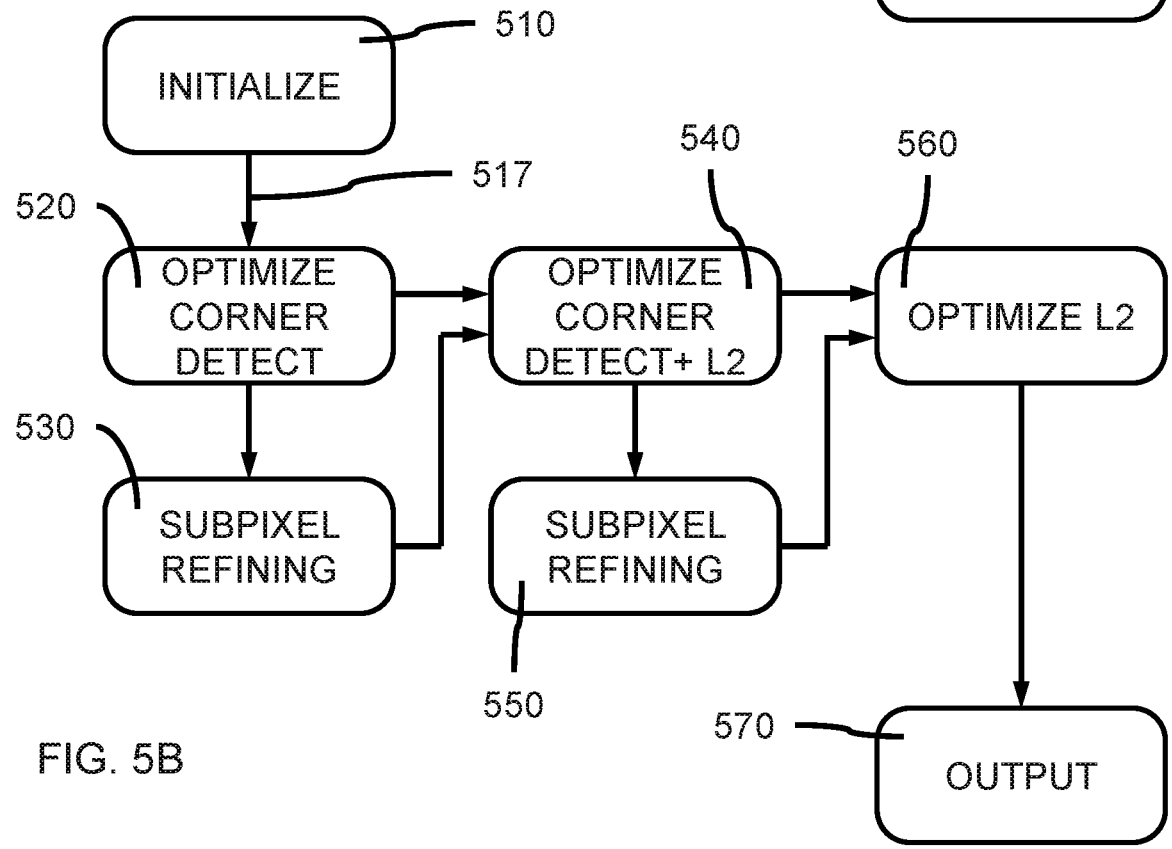
FIG. 5B shows an optimization process with an initial initialized process, according to aspects of the present disclosure.

FIG. 5B shows an optimization process with an initial initialized process, according to aspects of the present disclosure.

In various embodiments, the results of the initialization stage 510 (estimated extrinsic and optical distortion parameters) can be used to initialize all the above optimization processes. Alternatively, the results of the initialization stage 510 can be used to initialize the initial corner detection operation, and the results of the corner detection optimization can be used to initialize the corner detection and $L_2$ loss process. The results of the first optimization process 520 can be used to initialize the second optimization process 540, and the results of the second optimization process 540 can be used to initialize the third optimization process 560.

In various embodiments, an image can be projected from a real camera onto the virtual camera through a mapping. The mapping may be directly accomplished by finding the corresponding 3D point in the real world for each pixel of the virtual camera(s), and project this point to the image of the real camera(s). The mapping may be indirectly accomplished by starting with a set of corresponding 3D points (e.g., 3D mesh vertices), and projecting each 3D point to both the real camera and the virtual camera, thereby creating an indirect map from the virtual camera to the real camera. The mapping can utilize a variety of shapes for the world model.

In both methods, a simplified world model (e.g., flat world, bowl, etc.) can be used to find the corresponding 3D point. A flat region close to the vehicle and some kind of a wall at a farther distance may be utilized. For example, if a bowl shape is used, the "bottom" of the bowl can be a flat region bordered by curved walls, where the vehicle (e.g., car) can be located anywhere on the flat region, for example, in the center of the flat region. Other shapes may also be used for the world model. In various embodiments, an 8-parameter model that combines a bowl and a box can be utilized, where the model can be a three dimensional model.

Figure 6A:
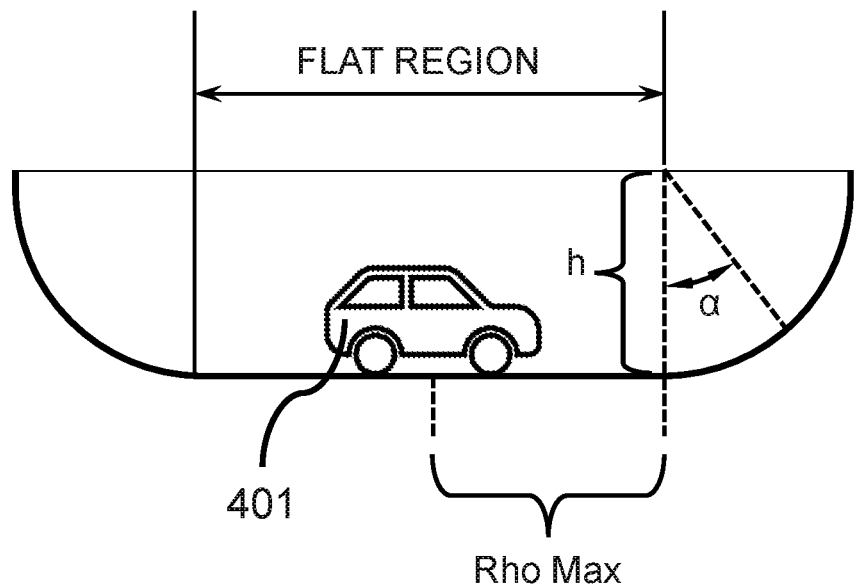
FIG. 6A shows a side view illustration of a vehicle in a simplified world model, according to aspects of the present disclosure.

FIG. 6A shows a side view illustration of a vehicle in a simplified world model, according to aspects of the present disclosure.

In a non-limiting exemplary embodiment, the car is located at the origin (0,0,0), the positive X-axis is defined according to the direction of the front of the car (i.e., driving direction), the positive Y-axis is defined as towards the right-hand side of the car, and the positive Z-axis is pointing upwards.

In various embodiments, the world model can include the 8 parameters: $r_a$, $r_b$, a, b, ellipse$_{factor}$, h, β, and f, that can describe a flat region and a curved region. The rho_max values (e.g., $\rho_{max}^{ellipse}$, $\rho_{max}^{rectangle}$) can be computed as a mixture of the ellipsoid and rectangular shapes and controlled by the ellipse_factor.

In various embodiments, the parameter h determines the height of the wall, where for example, the height of the wall for $$\alpha = \frac{\pi}{2}.$$

The curvature of the wall is controlled by parameter f. β controls the depth of the wall, that is, the horizontal distance from the beginning of the wall (e.g., around x=30) to the point the wall reaches a maximum height.

Figure 6B:
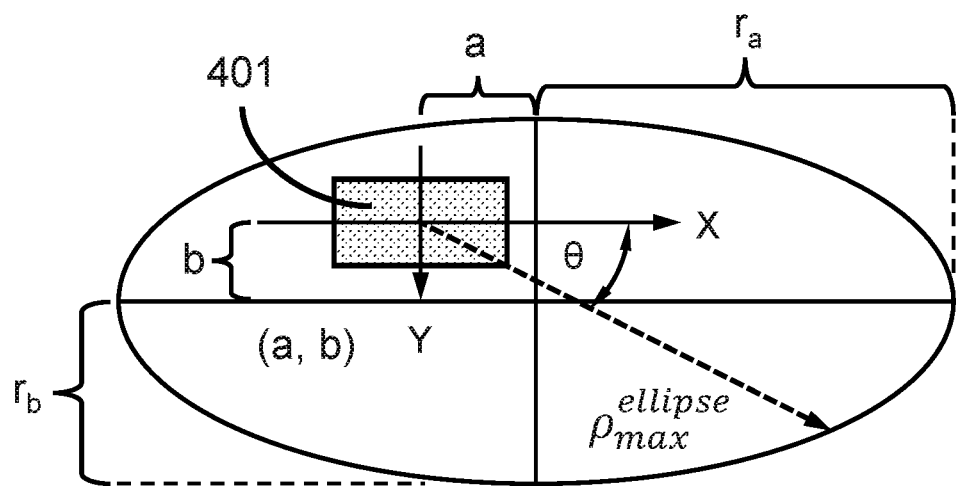
FIG. 6B shows a top view illustration of a vehicle in reference to an elliptical region of a simplified world model, according to aspects of the present disclosure.

FIG. 6B shows a top view illustration of a vehicle in reference to an elliptical region of a simplified world model, according to aspects of the present disclosure.

Two radii parameters can be used, with $r_a$ used for the radius in the x-axis and $r_b$ used for the radius in y-axis. The vehicle position with respect to the center of the flat region can be described by the parameters a and b. For a given direction defined by angle θ with respect to the x-axis, the distance from the vehicle to the "wall" (i.e., distance to the end of the flat region in the direction) can be computed.

A distance assuming an ellipse shaped flat region can be computed by solving the following ellipsoid equation for $\rho_{max}^{ellipse}$:

$$\frac{(\rho_{max}^{ellipse}\cos\theta - a)^2}{r_a^2} + \frac{(\rho_{max}^{ellipse}\sin\theta - b)^2}{r_b^2} = 1.$$

Figure 6C:
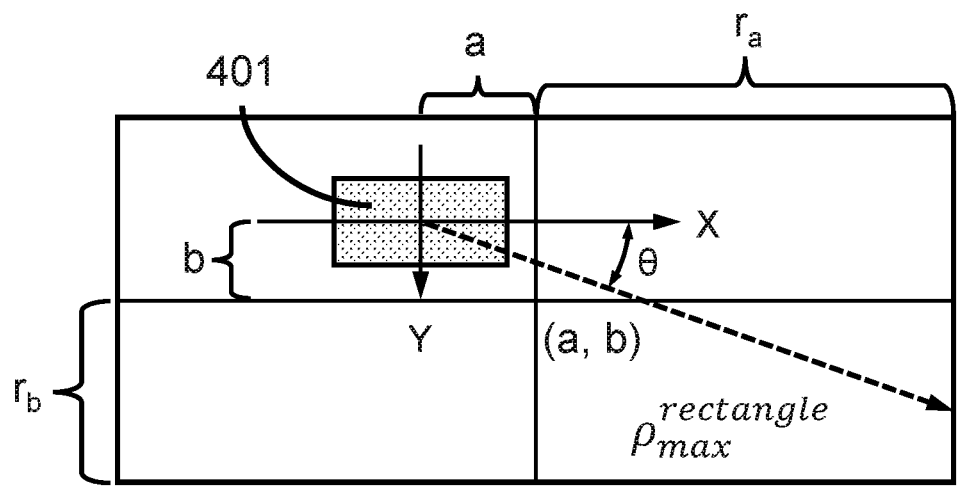
FIG. 6C shows a top view illustration of a vehicle in reference to a rectangular region of a simplified world model, according to aspects of the present disclosure.

FIG. 6C shows a top view illustration of a vehicle in reference to a rectangular region of a simplified world model, according to aspects of the present disclosure.

For a given direction defined by angle θ with respect to the x-axis, the distance from the vehicle to the "wall" (i.e., distance to the end of the flat region in the direction), the distance can be computed for a rectangular shaped flat region. The angles to the rectangle's corners can be computed as:

$$\theta_1 = \arctan\frac{b+r_b}{a-r_a}$$

$$\theta_2 = \arctan\frac{b-r_b}{a-r_a}$$

$$\theta_3 = \arctan\frac{b-r_b}{a+r_a}$$

$$\theta_4 = \arctan\frac{b+r_b}{a+r_a}$$

Then $p_{max}^{rectangle}$ can be computed as follows:

If $\theta_1 > \theta > \theta_4$ then $\rho_{max}^{rectangle} = \frac{b + r_b}{\sin\theta}$;

Else if $\theta_2 > \theta > \theta_1$ then $\rho_{max}^{rectangle} = \frac{a + r_a}{\cos\theta}$;

Else if $\theta_3 > \theta > \theta_2$ then $\rho_{max}^{rectangle} = \frac{b - r_b}{\sin\theta}$;

Else $\rho_{max}^{rectangle} = \frac{a + r_a}{\cos\theta}$.

The shape of the flat region can be computed as a combination of the ellipse shaped region and the rectangular shaped region using a parameter, ellipse_factor.

$$\rho_{max} = \text{ellipse\_factor} \cdot \rho_{max}^{ellipse} + (1 - \text{ellipse\_factor}) \cdot \rho_{max}^{rectangle}.$$

For given angles $\alpha$ and $\theta$ the corresponding 3D coordinates on the world model can be computed as:

$$x = \rho_{max}\left[1 + \beta\frac{\sin(f\alpha)}{\sin\left(f\frac{\pi}{2}\right)}\right]\cos\theta;$$

$$y = \rho_{max}\left[1 + \beta\frac{\sin(f\alpha)}{\sin\left(f\frac{\pi}{2}\right)}\right]\sin\theta;$$

$$z = h[1 - \cosh\alpha].$$

In various embodiments, the model parameters can be tuned in different ways, where the model can be fit to the actual scene, such that the shape of the model resembles the geometry of the real scene as closely as possible. The model's shape may be adjusted according to the vehicle state (e.g., speed and direction). Depth information, for example, from LiDAR (Light Detection and Ranging), may be used to dynamically control the model shape. Visual sensors (e.g., cameras and the images captured by the cameras) may be used directly, where the depth may be estimated from the captured images, for example, by structure from motion.

In various embodiments, using the depth information, the real environmental structure can be determined and the position of elevated objects around the vehicle mapped. From this map it can be inferred where the model's walls should be placed, for example, the wall can be placed at the distance of the closest elevated object. In various embodiments, the wall can be placed in the distance that is most occupied with elevated objects, for example, where there is a line of buildings along the side of the vehicle (e.g., car, van, truck, bus, etc.). The distance of the elevated objects may be asymmetric with respect to the vehicle, so parameters a and b may be tuned to control the position of the vehicle with respect to the center of the model's flat region.

In various embodiments, different model parameters may fit different scenarios. For example, large radii can fit the case where the car is driven on a wide highway with no traffic (or with only sparse traffic) on it. However, if the scene is changing (e.g., arriving in a traffic jam, or if the road narrows) it may be more suitable to use smaller radii. Abrupt parameter changes may result in a sudden, considerable scale change of an object, which can produce unpleasant results.

In various embodiments, the parameter changes can be smoothed, where if the geometry of the scene changes, two different model parameters may be fit to two different geometries. The change may be made gradually from a first set of parameters to a second set of parameters. For example, if for parameter $r_a$ the value $r_a^1$ is used for the first scene geometry and $r_a^2$ is used for a second scene geometry, the transition from $r_a^1$ to $r_a^2$ may be determined to last N frames.

In various embodiments, linear interpolation may be used, where if the transition from the first set of parameters to the second set of parameters starts at a frame number, s, then parameter $r_a$ can be computed for frame k as:

$$r_a = \frac{N - k + s}{N}r_a^1 + \frac{k - s}{N}r_a^2.$$

A non-linear transition scheme may also be used.

In various embodiments, inaccurate depth information or very noisy scenes can also be taken into consideration. To achieve temporal stabilization, the model parameters from the m previous frames may be taken into consideration. For example, given current computed value of $r_a^{in}$ for parameter $r_a$ and previous $r_a$ values $r_a^{prev}$ ($r_a^{prev}$ is a vector of size m and $r_a^{prev}[-1]$ is the value used for previous frame) the following heuristics can be used to choose $r_a$ ($r_a^{out}$):

If $\min(r_a^{prev}) \leq r_a^{in} \leq \max(r_a^{prev})$ then $r_a^{out} = r_a^{prev}[-1]$;

Else if $\frac{r_a^{in} - r_a^{prev}[-1]}{r_a^{prev}[-1]} > k_{max}$ then $r_a^{out} = r_a^{prev}[-1] \cdot (1 + k_{max})$;

Else if $\frac{r_a^{in} - r_a^{prev}[-1]}{r_a^{prev}[-1]} < -k_{max}$ then $r_a^{out} = r_a^{prev}[-1] \cdot (1 - k_{max})$;

Else: $r_a^{out} = r_a^{in}$;

where $k_{max}$ is a parameter for limiting maximal parameters change between consecutive frames.

The indirect method can be regular in 3D space, but after projection the grid can become irregular in the virtual 2D plane, where a projection of a 3D points (e.g., vertices of a 3D mesh) to the virtual camera may map to a non-uniform sampling of the 2D virtual image plane. However, the mapped 2D points may not be organized as a uniform grid, for example, because the sampling on the virtual image is non-uniform, there can be regions with dense sampling (in which there can be redundant information that can lead to redundant calculations), while other regions may suffer from sub-sampling (in which there is not enough data for reasonable interpolation).

The direct method is regular in the virtual image plane. A grid of sampling points in the virtual image plane (e.g., each pixel can be a grid point) can be selected, and the mapping to the corresponding 3D coordinates in the world can be computed directly for each grid point. Mapping from a pixel position in the virtual image plane to a 3D point on the world model poses a challenge. Given the virtual camera parameters, a corresponding ray or a direction of a "line-of-sight" can be computed for each pixel, but determining where this ray will intersect the world model may not have a closed-form solution. In various embodiments, an iterative method can be used to find the intersection with a general convex model, such as the combination of bowl and a box.

In various embodiments, the pixels can be mapped in a manner where the corresponding rays intersects the flat region of the model. The ray equation for each pixel can be described as:

$$X = At + b;$$

where X, A, and b are three-components vectors:

$$\left(X = \begin{bmatrix} x \\ y \\ z \end{bmatrix}\right).$$

The intersection with the ground plane (z=0) can be found by calculating the above equation, and solve for t:

$$\left(t = \frac{-b[2]}{A[2]}\right);$$

then solving for X and validating that the coordinates of the intersection fall inside the boundaries of the flat region. This method can be used not only with a flat region, but can be extended to other parts of the model for which the intersection with the ray equation can be solved analytically and verified to fall inside well-defined boundaries. For pixels that could not be mapped in this manner, an intersection with the "wall" may be found using an iterative process, as shown in FIG. 7.

Figure 7:
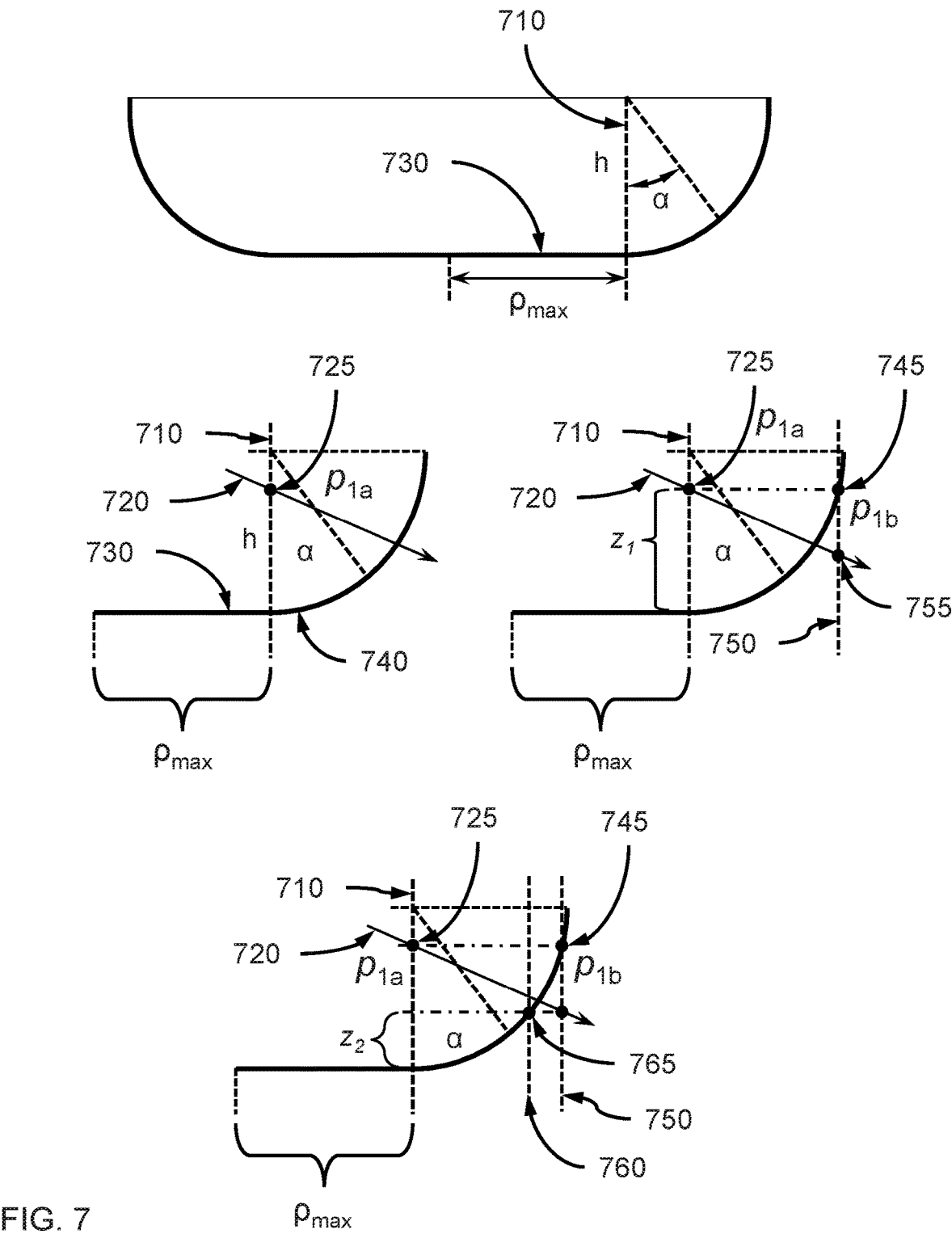
FIG. 7 shows an illustrative depiction of a method of finding an intersection between a line-of-sight and a wall region of a model by an iterative process, according to aspects of the present disclosure.

FIG. 7 shows an illustrative depiction of a method of finding an intersection between a line-of-sight and a wall region of a model by an iterative process, according to aspects of the present disclosure.

In various embodiments, a first vertical plane 710 can be placed at one of the four directions (+x, −x, +y, −y) based on the direction of a ray 720 representing a line-of-sight for a virtual camera. The first vertical plane 710 can be placed, for example, at the end of the flat region 730 and beginning of the wall region 740, and the first point of intersection 725 between the ray 720 and the first vertical plane 710 can be determined, where the first point of intersection 725 can be denoted as pia.

If the computed first point of intersection 725 lays on the flat region 730 or the wall region 740 of the three-dimensional model, the first point of intersection 725 satisfies the model's equation, so no further calculations are done, otherwise a first model intersection point 745, $p_{1b}$, on the model can be computed by plugging the z value of pia into the model equation.

In various embodiments, a second vertical plane 750 that passes through $p_{1b}$ can be determined, the second point of intersection 755 between the second vertical plane 750 and the ray 720 can be determined. If the computed second point of intersection 755 lays on the model, the second point of intersection 755 satisfies the model's equation, so no further calculations are done, otherwise a corresponding second model intersection point 765 is found. By using the new z value of the second point of intersection 755 in the model's equation, a third point of intersection between the third vertical plane 760 and the ray 720 can be determined.

The calculations and determinations can be continued until convergence is reached between the ray 720 and the model. However, for some pixels full convergence may not be reached, but a point that alternates between two model points $X_1$ and $X_2$ may be obtained.

In various embodiments, both model points ($X_1$ and $X_2$) can be projected onto the virtual image, yielding two points on the image plane ($x_1$ and $x_2$). The line connecting these two points can be computed, and a point $x_c$, which is closest to the original pixel for which a mapping is to be found, along the connecting line is determined.

In various embodiments, the normalized distance of this point from $x_i$ is computed as:

$$g = \frac{x_c - x_1}{x_2 - x_1}.$$

In various embodiments, the line connecting $X_1$ and $X_2$ and the point g between them is computed in 3D space, where point g is half way between the two points, $X_1$ and $X_2$. A target model point corresponding to the intersection point can then be calculated.

Figure 8:
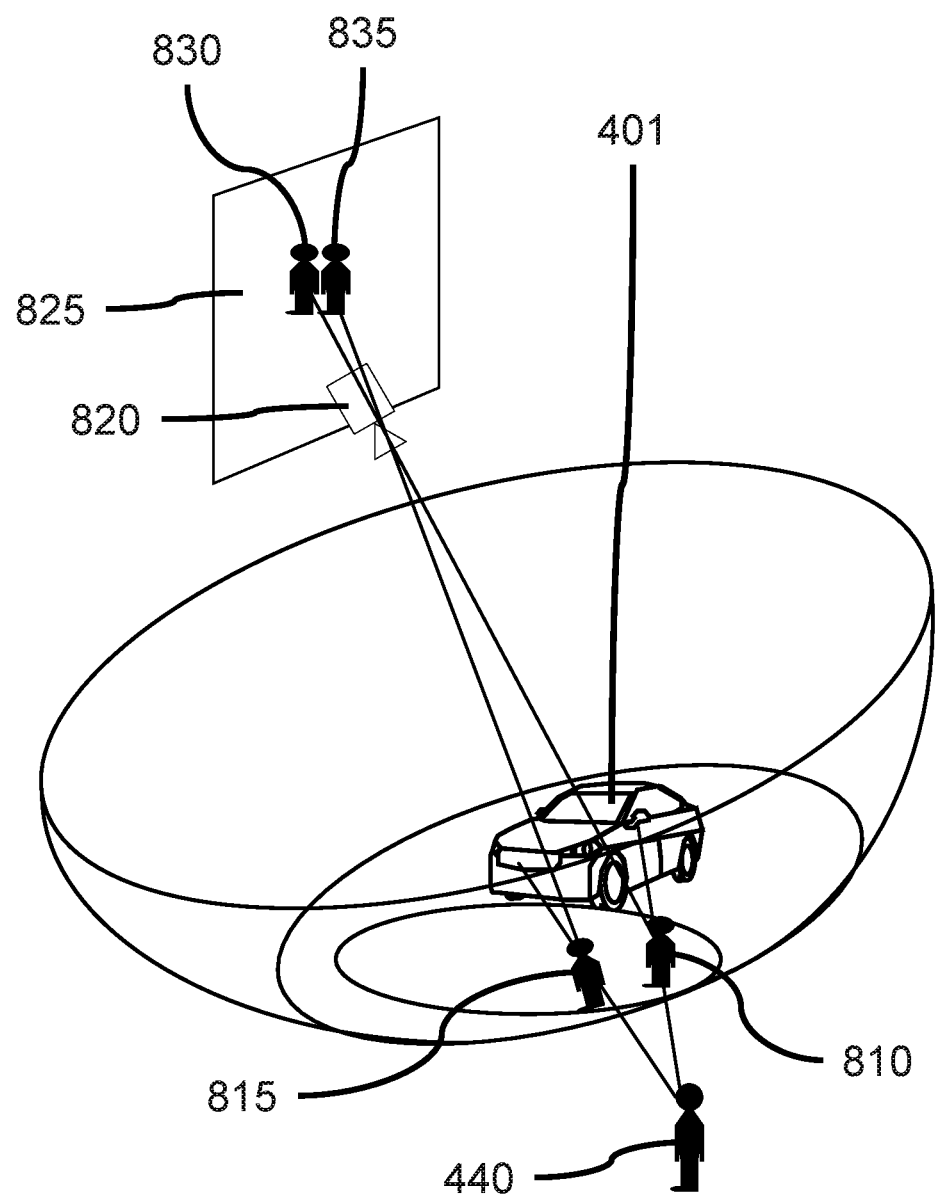
FIG. 8 shows an illustrative depiction of a world view model with a duplicated object, according to aspects of the present disclosure.

FIG. 8 shows an illustrative depiction of a world view model with a duplicated object, according to aspects of the present disclosure.

The world model is a simplified model that does not represent the exact geometry of the scene. Adjacent cameras may project the same object to different 3D coordinates over the simplified model. This mis-projection can generate artifacts, including duplication of objects, disappearing objects, breaking lines, ghosting, etc. Local fixes or fine stitching may be used to avoid such artifacts.

Due to mis-projection, an object may disappear or be duplicated in the image of the virtual camera. FIG. 8 depicts object duplication, where the same object 440 can be projected on the 3D model (bowl in this example) on two different places for two different physical cameras, where a first projected object image 810 can be formed by a first camera, and a second projected object image 815 can be formed by a second camera. If these two projected object images 810, 815 are visible to the virtual camera 820, both object images will be projected to the virtual camera image plane 825 and form two separate virtual object images 830, 835. This would then be presented to a user as two separate objects.

Figure 9:
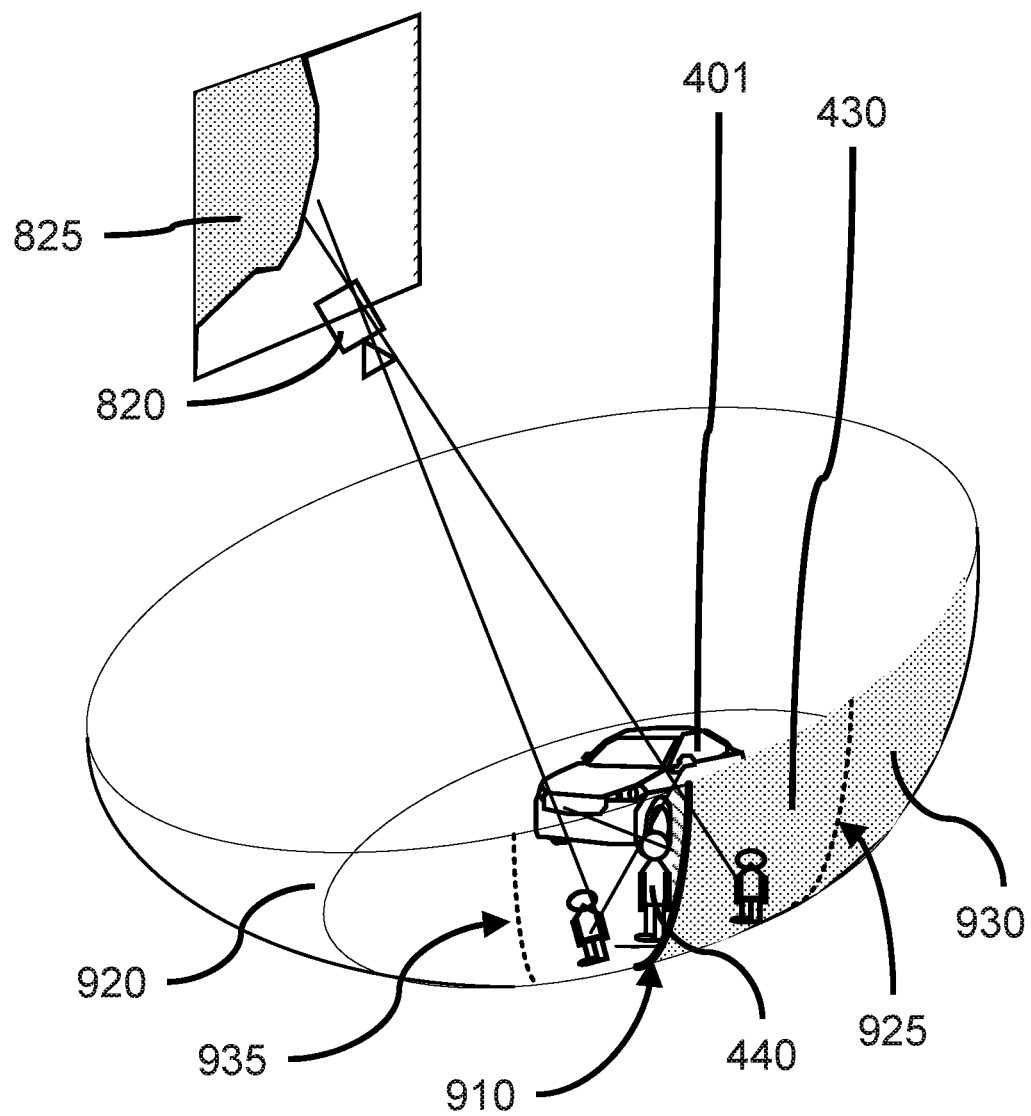
FIG. 9 shows an illustrative depiction of a world view model with a disappearing object, according to aspects of the present disclosure.

FIG. 9 shows an illustrative depiction of a world view model with a disappearing object, according to aspects of the present disclosure.

Stitching of two adjoining images can also cause an object 440 to disappear from the virtual image, due to the placement of a seam 910 (also referred to as a border), where the seam 910 indicates the boundary between the two stitched images generated by adjacent cameras, for example, one image rendered from the left-side view and a second image rendered from the front view. Because the field of view of the cameras on a vehicle 401 can extend beyond the seam 910, the front camera field of view 920 extends to the right dashed line 925 and the left-side camera field of view 930 extends left to the left dashed line 935. The region between the two dashed lines is, therefore, the overlapped region 430 between the two camera views.

Due to the selection of the seam 910, pixels from the front camera that are projected rightward from the seam 910 and pixels from the left-side camera that are projected leftward from the seam may be omitted, thereby causing an object in such an image region to disappear from the combined image. In such a case, the object would not be rendered at all if blending was not used in the overlapped region(s), as the object is projected to the right of the seam line by the front camera and to the left of the seam line by the left-wing camera. That is, without blending pixels from the front camera that are projected to the right of the seam and pixels from the left-wing camera projected to the left of the seam an image of the object would be omitted. Whereas, if blending is used, the pixels from the first camera are not omitted, but rather blended with the pixels from the second camera, which may generate a ghost image of the object, where the ghost image is projected having transparency on both sides of the seam. Having depth information for each pixel in the image, either a direct value or by interpolation, the pixels within the overlapping region 430 of two neighboring views can be analyzed. In various embodiments, only the pixels within the overlapping region 430 are analyzed.

In various embodiments, the stitching process of two images can include, finding matches between key points in the two images, and applying local transformations to one image to align the key points with a second image. In various embodiments, a direct linear transformation (DLT) can be applied locally to small patches of the image using matches between key points in the two images.

In various embodiments, to avoid the disappearance or duplication of the object, a different selection of the seam 910 position could be made, where pixels that are projected beyond the seam 910 are not omitted but rather an alpha blending is done between the views in the overlapped region. However, if only alpha blending is used, the ghosting artifact may still occur.

In various embodiments, the seam border can be set in a manner that the seam 910 will not pass through an object for which there would be a depth and/or photometric discrepancy between the two adjacent cameras. While the seam 910 is illustrated as a straight line, the seam can also be curved or zig-zagged to pass around objects and place pixels to one side or the other of the seam. This allows the priority blending to either include or exclude the whole object from the selected overlapping views. The image having a closer detected object can be prioritized based on the depth information for the pixels of an object in the different images. For example, the pixels of the object from one view could be excluded, but the pixels of the object from the other view could be included as a whole, without using the alpha blending that would cause ghosting. Alpha blending could still be used for pixels in an overlapped region for which there is no depth/photometric discrepancy.

In various embodiments, finding matches between key points in the two images can include detecting key points in each frame (e.g., detect salient features like corners, etc.), extracting a descriptor for each of the key points, and identifying a match between key points of the two images using a similarity metric of the descriptors. However, it can be difficult to find correspondences between two images that might be highly deformed, as the image from each camera is warped according to the mapping. The descriptors should be robust to scale, rotations and actually to general deformations. For extremely wide field of view cameras (e.g., fisheye lenses), the images may suffer from severely reduced spatial resolution at the periphery. Depth information may therefore be used to compute matches between the warped images. The computation of the matches can be done as follows:

In various embodiments, a point $P_1$ in one camera ("cam 1") is mapped to point $P_{virt}^1$ in the virtual camera image plane.

If there is depth information available for the camera ("cam 1"), the corresponding 3D point that is projected to $P_1$ in the real world, $P_{world}^1$, can be computed. The real depth of the projected object can be used, so the real coordinates of this object can be computed in the world frame, as opposed to the 3D coordinates on the world model that are the intersection between the line that connect $P_1$ and the corresponding object in the world and the world model. The real 3D coordinates can be retrieved rather the projected point on the convex 3d Model.

Using the camera matrix of a second camera ("cam 2") the 3D point can be projected onto cam 2's image plane, $P_2$. Using the depth map of the second camera, the 3D real world coordinates that corresponds to $P_2$–$P_{world}^2$ can be computed, and the corresponding 3D point that lays on the convex world model can be determined. A line between the location of cam 2 and the 3D point defined by the depth map of cam 2 can be determined. The intersection between the world model and the line that connects $P_2$ and $P_{world}^2$ can be computed. The intersection between the line and the world model surface can identify a 3D model point. This can be done, for example, by using an iterative process. $P_{virt}^2$ can be computed by projecting the $P_{world}^2$ onto the virtual camera plane. This can provide a match between point $P_{virt}^1$ in the warped image from the first camera ("cam 1") to point $P_{virt}^2$ in the warped image from the second camera ("cam 2"). The 3D model point can be projected onto the virtual camera image.

The above algorithm for fine stitching might result in a temporal instability. If in an image frame an object is contained in a patch that goes through a transformation, on the next image frame the same object can be contained in a different patch and goes through a different transformation. This can lead to a temporal artifact, even if each frame looks perfectly fine on its own. Misalignments or local motion can cause the value of the same pixel in an overlapping region to belong to different source points, which may not be included in an error term. A patch size can be, for example, 8×8 pixels, where the statistics for a patch can be used for composing an error function based on pixel differences. Pixel differences can be based on brightness, where views taken from different cameras with different brightness ranges can have some patches that are too dark or too bright (burned pixels) to construct a meaningful error function.

In various embodiments, to address this issue, pixels on adjacent frames can be matched and the local transformations applied to corresponding pixels in both frames can be adjusted. To match corresponding pixels, a feature extractor with a feature matcher can be used, or a depth map together with the information obtained from vehicle sensors, such as gyroscope, accelerometer, wheel ticks, steering angle, etc., may be used. The transformations can be adjusted using spatial properties, for example, if an affine transformation is used, the change in each one of the transformation's parameters (e.g., translation, rotation, scale, and shear) can be limited compared to the transformation applied to a previous frame.

In various embodiments, color harmonization can be done to reduce or eliminate visible illumination differences between the camera views as the images are combined together using a mesh. Given a set of overlapping views, the brightness and color can be adjusted to provide a resulting stitched image that looks uniform across the image seam.

If $C_{i,j}(p)$ is the color value at pixel, p, of image, i, overlapping, j, then:

$$U_{i,j} = \frac{1}{N_{i,j}} \sum_p C_{i,j}(p)^{\gamma_i}.$$

The error term can be:

$$E_1 = \frac{1}{2}\sum_{i=2}^{n}(U_{i-1,i} - U_{i,i-1}).$$

Because $\gamma_i=0$ (i=1, 2, ..., n) is an optimal solution to the problem, a prior term is added in order to keep the gamma coefficients close to unity. Moreover, normalization between color and the gamma-correction coefficient errors is considered. The error function becomes a non-linear form:

$$\min\ E_1 = \frac{1}{2}\left(\sum_{i=2}^{n}\frac{(U_{i-1,i} - U_{i,i-1})^2}{\sigma_N^2} + \sum_{i=1}^{n}\frac{(1-\gamma_i)^2}{\sigma_g^2}\right);$$

Where $\sigma_N$ and $\sigma_g$ are the standard deviations of the normalized color and luminance errors and gamma coefficients. A color correction can be performed for the whole image or only the overlapping areas.

In various embodiments, a linear correction can apply a gamma correction to correct brightness differences between the images, and then a direct linear correction can be applied to the color channels. A linear mapping that minimizes the color and brightness differences between the two images in their overlapping region can be generated, where this linear mapping may create a uniform effect. The means of the luma and color can be computed in the overlapping regions along the seams, and used to solve minimization problems in a direct form. This linear matching can be fast and efficient, and can work well when no mis-registrations are present. Each seam can receive an identifying index, where the luma (brightness data) and color data can be collected within the overlap region and along these seams.

In various embodiments, for color a collection can be formed of linear equations to be minimized using a simple least square approach. For luma, which is represented by a gamma value, the log of the average luma value and linear equations can be used.

To achieve a seamless surround-view image where the connection between the different views is not visible, the differences between the views can be smoothed. The brightness and chroma of the images can be consistent across the views.

In various embodiments, Alpha blending can be used for blending two overlapping images, so that the seam between the images is not be visible, where alpha blending weighs the pixels values near the seam according to the pixel's distance from the seam or from the image center. For example, $I(p)=wC_1(p)+(1-w)C_2(p)$, where, w, is a coefficient that varies between 0 and 1. $C_1(p)$, $C_2(p)$ are the pixel, p, values of images $I_1(p)$ and $I_2(p)$ in overlapped area $\Omega$, respectively.

A weight map can be constructed in the following manner:

Let $\Psi_n$ be the area where image n has no overlap with other images, and let $D_n(p)$ be the distance of every pixel in image n from $\Psi_n$:

$$w_{n,1}(p) = \frac{e^{-D_n(p)*\beta}}{e^{-D_n(p)*\beta} + e^{-D_{n-1}(p)*\beta}},$$

$$w_{n,2}(p) = \frac{e^{-D_n(p)*\beta}}{e^{-D_n(p)*\beta} + e^{-D_{n+1}(p)*\beta}}.$$

Let $\Omega_{n,1}$ be the overlap region between image n and n−1, and let $\Omega_{n,2}$ be the overlap region between image n and n+1, then:

$$w_n(p) = \begin{cases} w_{n,1}(p) & p \in \Omega_{n,1} \\ w_{n,2}(p) & p \in \Omega_{n,2} \\ 1 & p \in \Psi_n \\ 0 & p \in \Psi_n \cup \Omega_{n,1} \cup \Omega_{n,2} \end{cases}$$

In various embodiments, blending maps can be generated using the distance from a marked projected border of a pixel in a projected image. A weight can simulate how important the particular pixel value is within the projected view. The distance of the pixel from the camera's optical center either in the physical camera or the original input image can be used to calculate the weight applied to the pixel for blending. The difference in spatial resolution can be more pronounced with wide field of view cameras/lenses, where the spatial resolution is better at the optical center. As the spatial resolution drops farther from the optical center, this approach can apply a greater weight to pixels that are sourced from regions of higher spatial resolution.

For example, each pixel in the overlapped region (in the virtual camera image plane) is sourced from a blending of two pixel values, one pixel value from physical camera 1 (p1) and one from camera 2 (p2). If the original position (x,y) of p1 in the physical camera 1, before warping, is closer to the optical center (principle point), than the original position (x,y) of p2 in the physical camera 2, the pixel, p1, can be given greater weight. Therefore, if the original position of p1 is closer to the center in the camera 1 image plane, and the original position of p2 is farther from the center in the camera 2 image plane, when these pixels are to be blended together, a greater weight can be applied to p1. The pixels that are closer to a camera's optical center can be given greater weight and used to generate an image.

There are instances when a simple weighted blending cannot produce eye pleasing results. When a moving object passes between the views, blending the corresponding pixels can result in a ghosting effect. In various embodiments, to produce an acceptable result, depth information about the scene can be utilized to select a new location for the seam.

In various embodiments, the pixels in the projected images, the pixel's closest distance to the camera can be determined (e.g., each pixel can appear in one or two views, and the closest score can be determined). The pixels within the region of closest distance can be associated with the index of the view that produces that minimal distance. This can generate a new border for stitching. Pixels in each region in the priority map share a similar minimum distance from the camera in comparison to pixels in the default indices map.

In various embodiments, modifying the stitching location according to detected depth differences of close moving objects can improve the resulting image. The seams can be located between each pair of views in such a way that there are no large depth differences between the two views along the seam. This can ensure that blending is not applied between two pixels that might have similar colors but belong to different objects. Both the depth and the pixel color information can be combined and the results smoothed.

In various embodiments, a difference between every two neighboring views within their common seam region can be computed. A priority map can be used to select a "winning" view for the common seam. For the $k^{th}$ seam, either the $k^{th}$ or the k+1th view can be selected to have priority, where the closest view may be locally selected as the winning "priority view".

In various embodiments, for a pixel to be identified as a "priority pixel", the pixel's depth value would indicate that the pixel is closer to the camera, where a threshold for determining that a pixel is sufficiently close to the camera can be a tunable parameter. Alternatively, for the case of incorrect depth information, if the pixel's color values are different enough between the two views, the color differences can be used. The depth difference and color difference can be measured within a neighborhood around the pixel in question, where identified priority pixels can receive a full weight of "1" for the view. For each identified priority pixel and each pixel in its surrounding that was modified by the smoothing gaussian, the corresponding weight for the intersecting non-priority view can be updated, so that if the new weight of the priority view pixel is "w", the corresponding weight for this pixel is set to (1−w'). A weight can be assigned to the pixels along the seam.

For example, a border can separate a first image rendered from a left-wing view camera and a second image rendered from a front view camera, where a first boarder may be tween the left view only image portion and the overlapping region, and a second boarder may be between the front view only image portion and the overlapping region.

In various embodiments, a smoothing Gaussian can be applied to the pixels at the seam to prevent abrupt visible changes in the virtual image.

Figure 10:
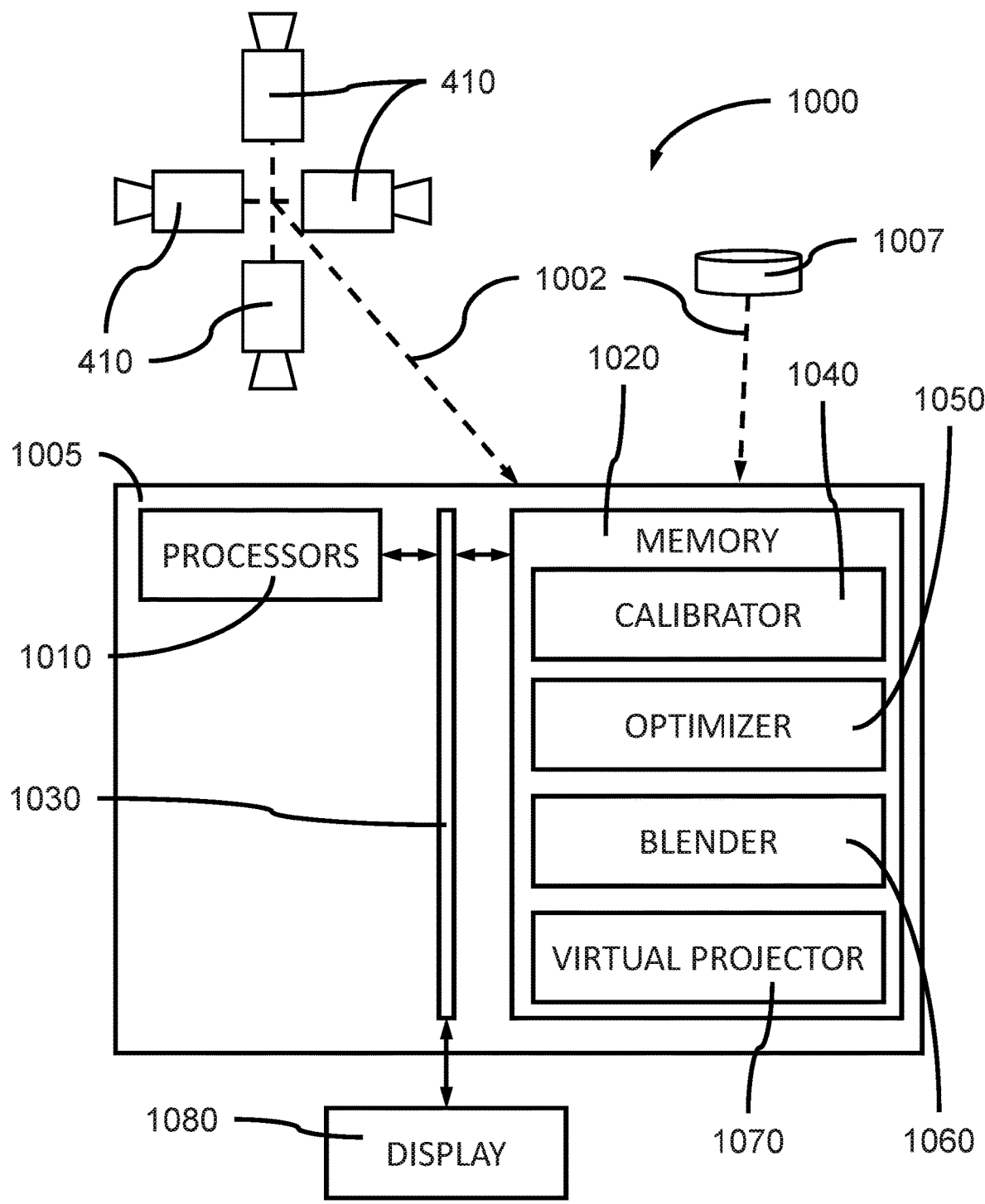
FIG. 10 shows a block diagram of a surround view system, according to aspects of the present disclosure.

FIG. 10 shows a block diagram of a surround view system, according to aspects of the present disclosure.

In various embodiments, a surround view system 1000 can include a plurality of cameras 410 and a virtual image generation system 1005, where the plurality of cameras 410 can be connected to and in communication with a virtual image generation system 1005. The virtual image generation system 1005 can include one or more processors 1010, a memory 1020, and a channel 1030 (e.g., a bus) connecting the one or more processors 1010 to the memory 1020. A display 1080 (e.g., computer screen, heads-up display, vehicle infotainment screen, smartphone screen, etc.) can be connected to and in communication with the virtual image generation system 1005 through the channel 1030, where a surround view can be presented to a user on the display 1080. A LiDAR sensor 1007 may be connected to and in communication with the virtual image generation system 1005, where the LiDAR sensor 1007 can provide object detection and depth information to the virtual image generation system 1005. A LiDAR sensor 1007 may be associated with each camera 410, where the LiDAR sensors 1007 can provide depth information for the pixel of the image captured by the associated camera 410.

In various embodiments, the plurality of cameras 410 can be digital video cameras, where the cameras 410 can be configured to capture multiple digital images in sequence. The digital images can be transmitted 1002 to the virtual image generation system 1005, where the digital images can be transmitted 1002 wirelessly or over a wired connection. The digital images can be received by the virtual image generation system 1005, where the digital images may be stored in the memory 1020.

In various embodiments, the depth information can be transmitted 1002 from the LiDAR sensor(s) 1007 to the virtual image generation system 1005, where the depth information (e.g., depth map) can be transmitted 1002 wirelessly or over a wired connection. The depth information can be stored in the memory 1020, where the depth information can be stored with the corresponding digital image.

In various embodiments, the one or more processors 1010 can be a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. The one or more processors 1010 can be configured to perform one or more operations based on received instructions, where the instructions can be stored in memory 1020.

In various embodiments, the memory 1020 can be random access memory (RAM), including dynamic random access memory (DRAM) and/or static random access memory (SRAM), read-only-memory (ROM), and/or long term memory, including solid state memory, magnetic memory (e.g., a hard disk drive) optical memory (e.g., compact optical disks, blu-ray, etc.), and combinations thereof.

In various embodiments, a calibrator 1040 can be stored in the memory 1020, where the calibrator 1040 can be configured to perform a calibration operation on the plurality of cameras 410. The calibrator 1040 can determine the intrinsic, extrinsic, and/or distortion parameters of the plurality of cameras 410 and the surround view system 1000, where the parameters can be stored in the memory 1020. The calibrator 1040 can be configured to compute the extrinsic and intrinsic parameters of a camera to provide for proper functioning of the surround view system 1000. The intrinsic and extrinsic parameters can be represented as transformation matrices that convert points from one coordinate system to the other, where the transformation matrices can be stored in the memory 1020. The calibration and transformation matrices can be based on a chessboard chart 200 used for the camera calibration. Once a camera has been calibrated, the image information can be utilized to recover 3-D information from 2-D images.

In various embodiments, an optimizer 1050 can be stored in the memory 1020, where the optimizer 1050 can be configured to perform an optimization operation. The optimization operation can minimize different loses for optimizing both extrinsic and optical distortion parameters, where initial extrinsic parameters may be used for the optimization operation. The optimizer 1050 can refine the intrinsic, extrinsic, and/or distortion parameters of the plurality of cameras 410 and the surround view system 1000. The extrinsic parameters and optical distortion parameters of all the cameras may be optimized simultaneously based on different loss terms. A refinement process can be applied to more accurately determine the location of corners in an image of a calibration pattern, where the calibration pattern can be the chessboard chart used for the camera calibration.

In various embodiments, a blender 1060 can be stored in the memory 1020, where the blender 1060 can be configured to perform a blending operation, where the blending operation can reduce artifacts and visual seams. The blender 1060 can be configured to perform priority blending to either include or exclude an entire object from overlapping views, and/or alpha blending for combining two overlapping images, so that a seam between adjoining images is not visible. The seams can be placed between each pair of views in such a way that there are no large depth differences between the two views along the seam. The blending operation can apply weights to the pixels of each image, where the weights can be stored in the memory 1020. The weights may form a weight map that can be stored in the memory 1020, where the weights can be assigned to corresponding pixels. The blender 1060 can be configured to perform a linear mapping that minimizes the color and brightness differences in an overlapping region between two adjoining images, where the linear mapping may create a uniform effect. The pixels along the seam can be blended based on the assigned weights along the seam.

In various embodiments, a virtual projector 1070 can be stored in the memory 1020, where the virtual projector 1070 can be configured to generate a virtual image of the model and surroundings, and present the virtual image to a user. The virtual image can be generated from a plurality of adjoining images received from the plurality of cameras 410. The virtual projector 1070 can map the pixels from the 3D world coordinates to virtual image 2D coordinates viewed by a virtual camera from the pixels detected by each of the multiple physical cameras 410. The virtual projector 1070 can generate a final stitched image applying the color harmonization and blending of the blender 1060, and present the final stitched image to the user, where the final stitched image can be presented on a display 1080.

Figure 11:
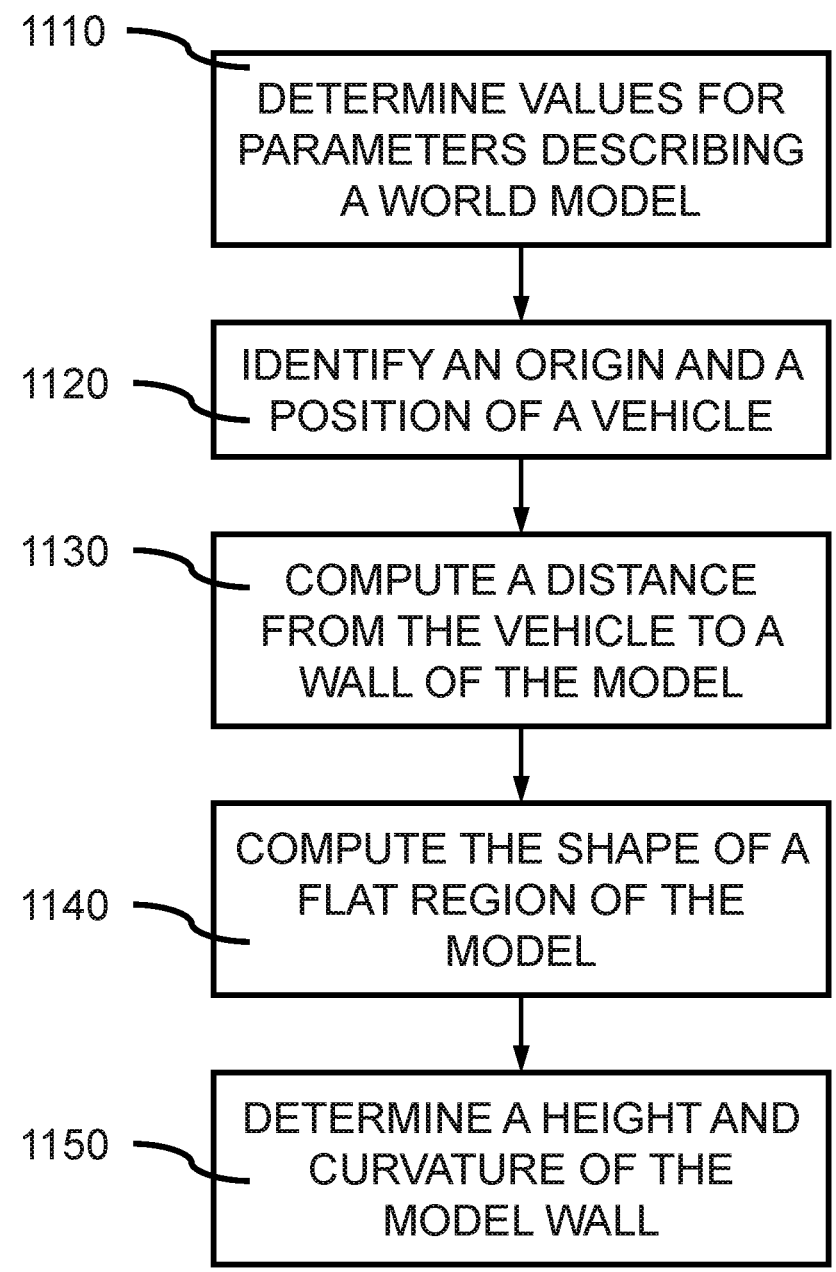
FIG. 11 shows a block/flow diagram of a method of generating a world model, according to aspects of the present disclosure.

FIG. 11 shows a block/flow diagram of a method of generating a world model, according to aspects of the present disclosure.

At operation 1110, the number of parameters and values for the parameters describing the world model can be determined. In various embodiments, a simplified world model can be an 8-parameter model that combines a bowl shape and a box shape. The bottom of the bowl can be a flat region bordered by curved walls. The 8 parameters can include: $r_a$, $r_b$, a, b, $ellipse_{factor}$, h, β, and f, where the parameters may be used to describe the flat region and to describe the curved region. The radius in the x-axis can be described by $r_a$, and the radius in y-axis can be described by $r_b$. A vehicle position with respect to the center of the flat region can be described by the parameters a and b. The height of the wall can be described by parameter h. The shape of the flat region can be computed as a combination of the ellipse shaped region and the rectangular shaped region using a parameter, ellipse_factor. The parameter f determines the curvature of the wall, and β determines the horizontal distance from the beginning of the wall to the point the wall reaches the maximum height (also referred to as the depth of the wall).

At operation 1120, an origin of the world model and the position of a vehicle relative to the origin can be determined.

At operation 1130, a distance from the vehicle to a wall of the model can be computed based on the parameters, origin, and vehicle position. The vehicle (e.g., car) can be located on the flat region of the world model.

At operation 1140, the shape of the flat region of the world model can be computed, where the flat region can have a rectangular (e.g., box) shape, an elliptical shape, or a combination thereof.

At operation 1150, the height and curvature of the wall(s) forming the world model can be determined, where the height and curvature can be based on the f and β parameter.

In a non-limiting exemplary embodiment, $r_a$=30 meters, $r_b$=5 meters, a=0, b=0, ellipse_factor=0.2, h=30 meters, β=0.1, and f=0.1.

Figure 12:
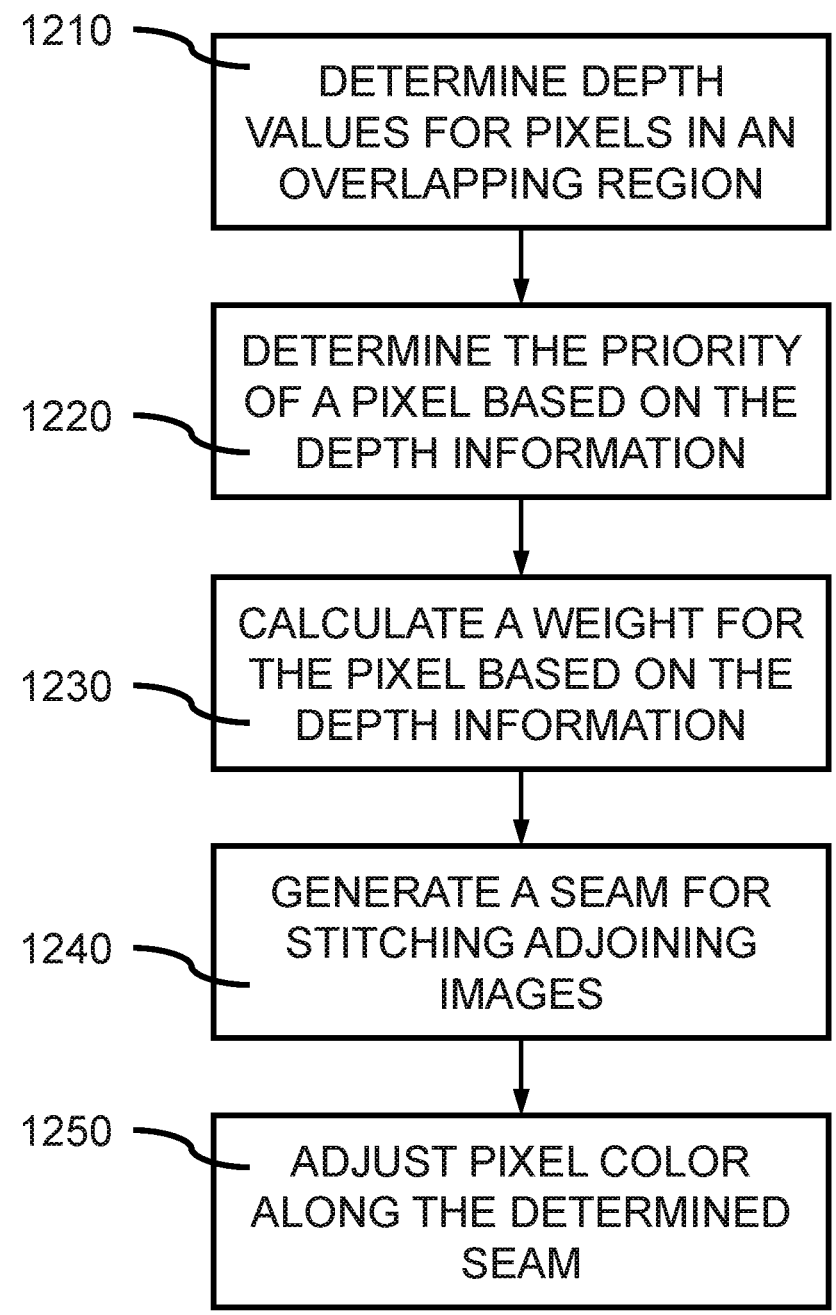
FIG. 12 shows a block/flow diagram of a method of blending images, according to aspects of the present disclosure.

FIG. 12 shows a block/flow diagram of a method of blending images, according to aspects of the present disclosure.

At operation 1210, depth values can be determined for the pixels forming two overlapping images, where the depth values can be for the pixels in an overlapping region between the two images. The depth values may be determined directly, for example, through a sensor (e.g., LiDAR), or indirectly by estimating the depth of pixels from the captured images, for example, by structure from motion.

At operation 1220, the priority of two pixels that would map to the same position can be determined based on the depth information, where the pixel closer to the camera can be given a higher priority for forming a virtual image.

At operation 1230, a weight can be calculated for the image pixels based on the depth information and/or the spatial resolution of the camera, where the weight can indicate the importance of the particular pixel value in the projected view (virtual image). The assigned weight can be based at least in part on a distance of the pixel from an optical center of a camera obtaining the image and/or the depth information of the pixel.

At operation 1240, a seam can be generated within the overlapping region that stitches the adjoining images together, where the seam indicates the boundary between the two stitched images. The seam between the two adjoining images can be selected based on minimal depth differences and/or minimal photometric differences between the pixels of the two images.

At operation 1250, the brightness and color can be adjusted along the seam to provide a resulting stitched image that looks uniform across the image seam. To ensure that blending is not applied between two pixels that have similar colors but belong to different objects, the depth values and the pixel color information can be combined and the results smoothed, for example, by applying a smoothing gaussian filter to the pixel weights.

Figure 13:
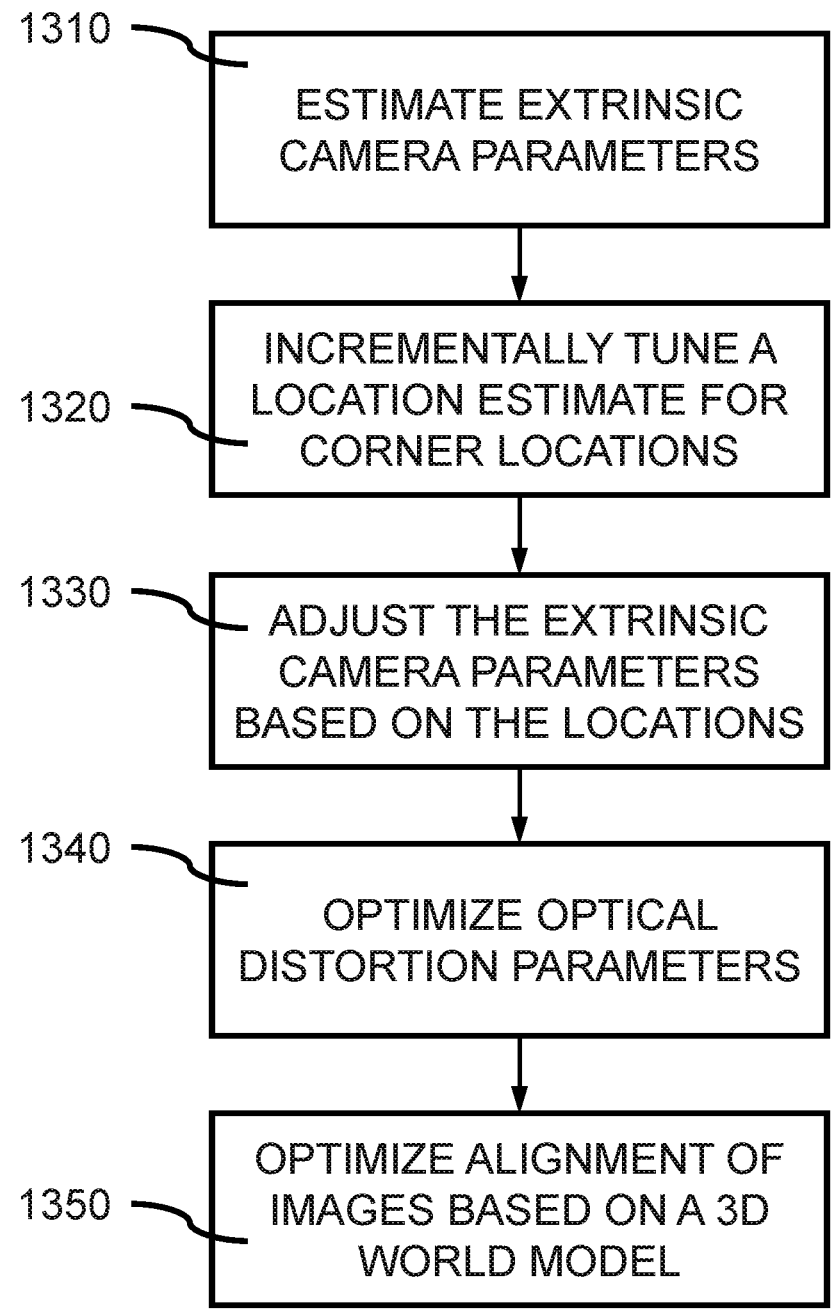
FIG. 13 shows a block/flow diagram of a method of calibrating a camera system, according to aspects of the present disclosure.

FIG. 13 shows a block/flow diagram of a method of calibrating a camera system, according to aspects of the present disclosure.

At operation 1310, the extrinsic camera parameters of a plurality of cameras can be estimated based on detection of corners in a camera calibration arrangement (e.g., chessboard). The location estimate for the detected corners can be based on the pixels of the image of the corners projected on the image plane of the respective camera.

At operation 1320, the location estimate for the detected corners can be incrementally tuned, where the tuning can be based on loss terms to detect periphery corners and central corners. The location estimate for the detected corners can be incrementally tuned by applying a corner detector to the pixels of the image of the corners projected on the image plane of the respective camera. A corner-ness score can be calculated based on the corner detector.

At operation 1330, the values calculated for the extrinsic camera parameters can be adjusted based on the detected corners and tuning by the corner detector.

At operation 1340, the optical distortion parameters of the cameras can be optimized based on a loss term. Both extrinsic parameters and optical distortion parameters of all the cameras can be optimized simultaneously, where different loss terms can be used to optimize the parameters.

At operation 1350, the alignment of the adjoining images can be optimized. View misalignment may be adjusted to find and fix local warpings.

Figure 14:
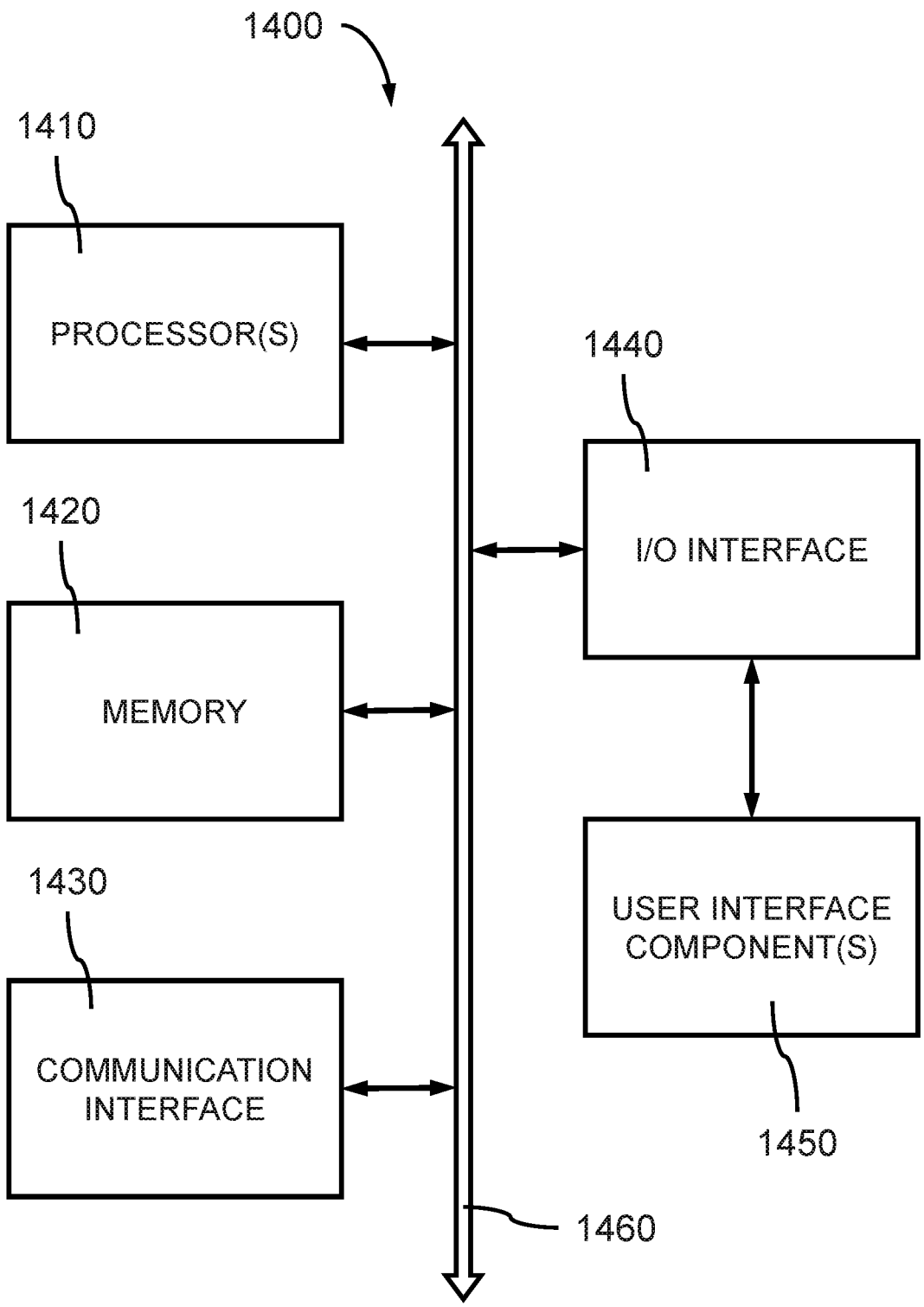
FIG. 14 shows an example of a computer system, according to aspects of the present disclosure.

FIG. 14 shows an example of a computer system, according to aspects of the present disclosure.

In an aspect, the computer device 1400 includes processor(s) 1410, memory subsystem 1420, communication interface 1430, I/O interface 1440, user interface component(s) 1450, and channel 1460. In various embodiments, a computer device 1400 can be configured to perform the operations described above and illustrated in FIG. 1-13.

In some embodiments, computer device 1400 is an example of, or includes aspects of, surround view system of FIG. 10, where the computer device 1400 can be an on-board vehicle computer. In various embodiments, computing device 1400 includes one or more processors 1410 that can execute instructions stored in memory subsystem 1420 for constructing a 3D model.

According to some aspects, computing device 1400 includes one or more processors 1410. In some cases, a processor 1410 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1410 is configured to operate a memory array using a memory controller. In other cases, a memory controller is integrated into a processor 1410. In some cases, a processor 1410 is configured to execute computer-readable instructions stored in a memory subsystem 1420 to perform various functions. In some embodiments, a processor 1410 includes special-purpose components for modem processing, baseband processing, digital signal processing, or transmission processing.

According to some aspects, memory subsystem 1420 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory subsystem 1420 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1430 operates at a boundary between communicating entities (such as computing device 1400, one or more user devices, a cloud, and one or more databases) and channel 1460 (e.g., bus) and can record and process communications. In some cases, communication interface 1430 is provided to enable a processing system coupled to a transceiver (e.g., a transmitter and/or a receiver). In some examples, the transceiver is configured to transmit (or send) and receive signals for a communications device via an antenna. In various embodiments, the computing device 1400 can receive signals from one or more cameras using communication interface 1430.

According to some aspects, user interface component(s) 1450 enable a user to interact with computing device 1400. In some cases, user interface component(s) 1450 include an audio device, such as an external speaker system, a microphone, an external display device such as a display screen, an input device (e.g., a remote control device interfaced with a user interface directly or through the I/O controller), or a combination thereof. In some cases, user interface component(s) 1450 include a graphical user interface (GUI).

According to some aspects, I/O interface 1440 is controlled by an I/O controller to manage input and output signals for computing device 1400. In some cases, I/O interface 1440 manages peripherals not integrated into computing device 1400. In some cases, I/O interface 1440 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component(s) 1450, including, but not limited to, a modem, a keyboard, a mouse, a touchscreen, or a similar device. In some cases, the I/O controller is implemented as a component of a processor. In some cases, a user interacts with a device via I/O interface 1440 or via hardware components controlled by the I/O controller.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of generating a virtual camera view, comprising:
   receiving a plurality of adjoining images, wherein the plurality of adjoining images include pixels;
   detecting one or more objects in each of the plurality of adjoining images;
   receiving depth information for the pixels of the one or more detected objects;
   analyzing a mismatch between each of the adjoining images;
   prioritizing the image having a closer detected object based on the depth information;
   forming a virtual image by merging the adjoining images together, wherein pixels of the prioritized image are used in an overlap region of the adjoining images; and
   identifying a seam location between the adjoining images according to a path of minimal depth discrepancy between the adjoining views.

2. The method of claim 1, further comprising:
   assigning a weight to the pixels along the seam; and
   blending the pixels along the seam based on the assigned weights.

3. The method of claim 2, wherein:
   the assigned weight is based on a distance of the pixel from an optical center of a camera obtaining the image.

4. The method of claim 3, further comprising:
   adjusting a position of the seam based on depth information for the pixels along the seam.

5. The method of claim 4, further comprising:
   applying color harmonization to the adjoining images along the seam.

6. A virtual image generation system, comprising:
   a plurality of cameras positioned relative to an origin; and
   one or more processors that receive a communication signal from the plurality of cameras,
   wherein the virtual image generation system is configured to generate a virtual image from a plurality of adjoining images received from the plurality of cameras;
   wherein each of the adjoining images include pixels, and wherein the virtual image is formed based on a mismatch between each of the adjoining images and prioritizing the adjoining image that has a closer object based on depth information, and merging the adjoining images together, wherein the pixels of the prioritized image are used in an overlap region of the adjoining images.

7. The virtual image generation system of claim 6, wherein:
   the virtual image generation system is further configured to identify a seam location between the adjoining images according to a path of minimal depth discrepancy between the adjoining images based on the depth information, wherein the adjoining images are merged along the seam.

8. The virtual image generation system of claim 7, wherein:
   the virtual image generation system is further configured to use pixels of the prioritized image in an overlap region of the adjoining images.

9. The virtual image generation system of claim 6, further comprising:
   a plurality of LiDAR sensors, wherein the virtual image generation system is further configured to receive a communication signal from each of the plurality of LiDAR sensors, and wherein the communication signal includes the depth information.

10. The virtual image generation system of claim 6, further comprising:
    a memory coupled to the one or more processors, wherein the depth information is stored in the memory with an associated image of the plurality of adjoining images.

11. The virtual image generation system of claim 10, further comprising:
    the virtual image generation system is further configured to utilize a three-dimensional model.

* * * * *